United States Patent
Theimer et al.

(10) Patent No.: US 11,941,413 B2
(45) Date of Patent: Mar. 26, 2024

(54) MANAGED CONTROL PLANE SERVICE

(71) Applicant: Amazon Technologies, Inc., Seattle, WA (US)

(72) Inventors: Marvin Theimer, Seattle, WA (US); Ryan Walter Jason Waite, Kirkland, WA (US); Atanas Ivanov, Mercer Island, WA (US); Earl Robert Kinney, Seattle, WA (US); Jonathan Thompson, Vienna, VA (US); Donald Kneath Bushell, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/915,943

(22) Filed: Jun. 29, 2020

(65) Prior Publication Data
US 2021/0406039 A1    Dec. 30, 2021

(51) Int. Cl.
G06F 9/445    (2018.01)
G06F 9/52     (2006.01)
G06F 9/54     (2006.01)
H04L 67/10    (2022.01)

(52) U.S. Cl.
CPC .......... *G06F 9/44526* (2013.01); *G06F 9/52* (2013.01); *G06F 9/542* (2013.01); *H04L 67/10* (2013.01)

(58) Field of Classification Search
CPC .............................. G06F 9/54; G06F 9/44526
See application file for complete search history.

(56) References Cited

U.S. PATENT DOCUMENTS

| | | |
|---|---|---|
| 6,826,568 B2 | 11/2004 | Bernstein et al. |
| 6,976,257 B2 | 12/2005 | Leymann et al. |
| 7,577,554 B2 | 8/2009 | Lystad et al. |
| 7,636,801 B1 | 12/2009 | Kekre et al. |
| 8,055,586 B1 | 11/2011 | Sirota |
| 8,099,480 B1 | 1/2012 | Muthusrinivasan et al. |

(Continued)

FOREIGN PATENT DOCUMENTS

| | | |
|---|---|---|
| CN | 106874073 A | 6/2017 |
| WO | 2008015417 A1 | 2/2008 |

OTHER PUBLICATIONS

Jeff Barr, "Amazon EC2 Container Service (ECS)—Container Management for the AWS Cloud," Amazon.com, Nov. 2014. Retrieved from: https://aws.amazon.com/blogs/aws/cloud-container-management/, pp. 1-6.

(Continued)

*Primary Examiner* — Kevin L Young
*Assistant Examiner* — Carina Yun
(74) *Attorney, Agent, or Firm* — Robert C. Kowert; Kowert, Hood, Munyon, Rankin & Goetzel, P.C.

(57) ABSTRACT

At a managed control plane service, end-user application programming interfaces (APIs) of an application to be implemented at a provider network are determined. A set of common operational requirements of the application, to be fulfilled without obtaining program code for the requirements, are identified. In response to an invocation of an end-user API of the application, computations are performed at a resource selected by the managed control plane service, and one or more tasks to satisfy a common operational requirement are initiated by the managed control plane service.

18 Claims, 15 Drawing Sheets

(56) References Cited

U.S. PATENT DOCUMENTS

| | | | |
|---|---|---|---|
| 8,145,595 B2 | 3/2012 | Kloppmann et al. | |
| 8,195,693 B2 | 6/2012 | Syeda-Mahmood | |
| 8,589,549 B1* | 11/2013 | Vermeulen | G06F 9/50 709/226 |
| 9,003,425 B2 | 4/2015 | Saha et al. | |
| 9,262,228 B2 | 2/2016 | Bond et al. | |
| 9,367,434 B2 | 6/2016 | Taneja et al. | |
| 9,569,203 B2 | 2/2017 | Breh et al. | |
| 9,619,788 B2 | 4/2017 | Helbok et al. | |
| 9,678,726 B1* | 6/2017 | Massaguer | G06F 8/54 |
| 9,690,546 B2 | 6/2017 | Ben Jemaa et al. | |
| 9,910,697 B2 | 3/2018 | DeArment | |
| 10,120,744 B1 | 11/2018 | Mahapatra et al. | |
| 10,152,232 B1 | 12/2018 | Kleiner et al. | |
| 10,635,789 B1 | 4/2020 | Golden et al. | |
| 10,684,966 B1 | 6/2020 | Hamman et al. | |
| 10,719,503 B1* | 7/2020 | Bar Oz | G06F 16/219 |
| 2002/0116205 A1 | 8/2002 | Ankireddipally et al. | |
| 2002/0156841 A1 | 10/2002 | Landfeldt et al. | |
| 2002/0180792 A1* | 12/2002 | Broussard | G06F 3/0481 715/764 |
| 2003/0058884 A1* | 3/2003 | Kallner | H04L 65/1101 370/465 |
| 2003/0074177 A1* | 4/2003 | Bowen | G06F 30/33 703/22 |
| 2003/0084156 A1 | 5/2003 | Graupner et al. | |
| 2004/0230636 A1 | 11/2004 | Masuoka et al. | |
| 2005/0005272 A1 | 1/2005 | Moody et al. | |
| 2006/0136428 A1 | 6/2006 | Syeda-Mahmood | |
| 2007/0223476 A1 | 9/2007 | Fry | |
| 2008/0065455 A1 | 3/2008 | Sun et al. | |
| 2008/0072195 A1 | 3/2008 | Mukaiyama | |
| 2008/0154824 A1 | 6/2008 | Weir et al. | |
| 2008/0282262 A1 | 11/2008 | Chrysanthakopoulos | |
| 2009/0063516 A1 | 3/2009 | Wang et al. | |
| 2009/0172689 A1 | 7/2009 | Bobak et al. | |
| 2009/0183170 A1 | 7/2009 | Gharpure | |
| 2009/0216711 A1 | 8/2009 | Yu et al. | |
| 2009/0217306 A1 | 8/2009 | Wusthoff et al. | |
| 2009/0235252 A1 | 9/2009 | Weber et al. | |
| 2010/0223385 A1 | 9/2010 | Gulley et al. | |
| 2010/0229162 A1 | 9/2010 | Hada et al. | |
| 2010/0281359 A1 | 11/2010 | Cao et al. | |
| 2012/0221659 A1 | 8/2012 | Brown et al. | |
| 2012/0226737 A1 | 9/2012 | Rajaraman | |
| 2012/0304243 A1 | 11/2012 | Li et al. | |
| 2013/0104150 A1 | 4/2013 | Rdzak | |
| 2013/0124807 A1* | 5/2013 | Nielsen | G06F 11/1438 711/162 |
| 2014/0032617 A1 | 1/2014 | Stanfill | |
| 2014/0039865 A1 | 2/2014 | Li et al. | |
| 2014/0324908 A1 | 10/2014 | Graham et al. | |
| 2015/0156286 A1 | 6/2015 | Blair | |
| 2015/0261580 A1 | 9/2015 | Shau et al. | |
| 2015/0264119 A1 | 9/2015 | Shau et al. | |
| 2015/0264122 A1 | 9/2015 | Shau et al. | |
| 2015/0278395 A1 | 10/2015 | Ben Jemaa et al. | |
| 2015/0332021 A1 | 11/2015 | Godla | |
| 2015/0356301 A1 | 12/2015 | Diehl et al. | |
| 2015/0379072 A1 | 12/2015 | Dirac et al. | |
| 2016/0105489 A1 | 4/2016 | Llorca et al. | |
| 2016/0315921 A1 | 10/2016 | Dara et al. | |
| 2017/0195173 A1 | 7/2017 | Izenberg et al. | |
| 2017/0214696 A1 | 7/2017 | Cleaver et al. | |
| 2017/0285981 A1 | 10/2017 | DeArment | |
| 2017/0323089 A1 | 11/2017 | Duggal et al. | |
| 2017/0337380 A1 | 11/2017 | Domke et al. | |
| 2018/0107821 A1 | 4/2018 | Eshkenazi et al. | |
| 2018/0204117 A1 | 7/2018 | Brevdo | |
| 2018/0270165 A1 | 9/2018 | Chen et al. | |
| 2019/0213104 A1* | 7/2019 | Qadri | G06F 21/12 |
| 2019/0306010 A1* | 10/2019 | Medam | G06F 9/546 |
| 2019/0306138 A1* | 10/2019 | Carru | H04L 41/28 |
| 2019/0339982 A1 | 11/2019 | Carrier et al. | |
| 2020/0133744 A1* | 4/2020 | Macleod | G06F 9/54 |
| 2021/0019194 A1 | 1/2021 | Bahl et al. | |
| 2021/0135983 A1 | 5/2021 | Farnham | |

OTHER PUBLICATIONS

Jeff Barr, "AWS Lambda—Run Code in the Cloud," Amazon.com, Nov. 2014. Retrieved from: https://aws.amazon.com/blogs/aws/run-code-cloud/, pp. 1-9.

Jeff Barr, "Amazon API Gateway—Build and Run Scalable Application Backends," Amazon.com, Jul. 2015. Retrieved from: https://aws.amazon.com/blogs/aws/amazon-api-gateway-build-and-run-scalable-application-backends/, pp. 1-14.

Jeff Barr, "API Gateway Update—New Features Simplify API Development," Amazon.com, Sep. 2016. Retrieved from: https://aws.amazon.com/blogs/aws/api-gateway-update-new-features-simplify-api-development/, pp. 1-11.

U.S. Appl. No. 16/282,182, filed Feb. 21, 2019, Richard Hamman et al.

U.S. Appl. No. 15/629,559, filed Jun. 21, 2017, Robin Alan Golden et al.

U.S. Appl. No. 16/858,408, filed Apr. 24, 2020, Robin Alan Golden et al.

U.S. Appl. No. 16/915,957, filed Jun. 29, 2020, Michael Groenewald et al.

International Search Report and Written Opinion dated Oct. 8, 2021 in International Application No. PCT/US2021/035586, Amazon Technologies, Inc., pp. 1-14.

Jazayeri, Bahar et al., "On-the-Fly Computing Meets IoT Markets—Towards a Reference Architecture," 2017 IEEE International Conference on Software Architecture Workshops (ICSAW), Apr. 5, 2017, pp. 120-127.

* cited by examiner

Welcome to the managed application specification tool!

To watch a tutorial about using the MCPS, click here  702

To access example application specifications click here  704

Enter application/service name 710

Enter application/service description 712

Upload application specification 714   (or use our AppSpecBuilder tool)

Common operational requirements 716

For explanations of supported common operational requirements, click here  717

Use default plugins for all 718

| Logging 720 | Use default plugin 722 | Choose plugin 724 | No plugins needed 726 |
| Metrics collection 730 | Use default plugin 732 | Choose plugin 734 | No plugins needed 736 |

...

Proceed to next step 755

FIG. 7

Determine, at an MCPS based on analysis of input received via a programmatic interface, (a) that a particular application App1 to be implemented at a provider network comprises several constituent services (micro-services), (b) mappings between end-user or external APIs of App1 and one or more of the constituent services and (c) a set of common operational requirements (COR) which are to be fulfilled for App1 and its constituent services (e.g., logging, monitoring etc.) 1401

↓

Automatically generate/infer DAG representing sequences of request/response messages among constituent services needed to respond to various end-user APIs of App1; determine persistent storage and/or transaction requirements for state information of App1, select storage resources to be used 1404

↓

Receive a deployment/activation request for App1, which does not specify resources to be used for App1 1407

↓

When an API request is received, coordinate/orchestrate interactions between the constituent services needed to fulfill the request: e.g., cause an inter-service request to be populated at a resource selected by the MCPS for a constituent service CS1, cause the request to be sent to another resource selected by the MCPS for a constituent service CS2 via an intermediary resource of the MCPS, without requiring service integration code to be provided by App1's owner, and use COR plugins obtained/registered at the MCPS to fulfill COR requirements (e.g., to generate logs of inter-service requests, to throttle inter-service requests etc.) 1413

↓

Updates to COR plugins are deployed transparently by the MCPS, without requiring any code changes in App1; similarly, schema changes for data objects of App1 (resulting for example from updated APIs) are handled transparently by MCPS, without requiring any storage-related decisions to be made by App1 owners/developers 1417

*FIG. 14*

MANAGED CONTROL PLANE SERVICE

BACKGROUND

In recent years, more and more complex applications, often presented to end users as network-accessible services accessible using web service interfaces, are being implemented using resources of provider networks or cloud computing environments. Such applications or services can usually be logically subdivided into a control plane and a data plane. The control plane comprises the portion of the application which is responsible for administrative tasks such as identifying, provisioning, configuring and managing (e.g., with respect to possible failures) resources which can be used to fulfill the needs of application customers. The data plane comprises the portion of the application which processes, stores and/or transmits the data associated with end-user requests submitted by application customers.

Typically, a respective team of engineers is tasked with designing, developing and testing all the components of each complex application before the application can be deployed for end users. The application may itself use multiple services of a provider network, such as various types of computing services, storage services, database services and the like, so the engineers may have to become familiar with each of the services employed. The engineering teams may also be responsible for updating the application components as and when new requirements are identified and approved for the applications.

BRIEF DESCRIPTION OF DRAWINGS

FIG. 7 illustrates aspects of an example graphical interface which may be used to specify properties of an application to be implemented with the help of a managed control plane service, according to at least some embodiments.

FIG. 14 is a flow diagram illustrating aspects of operations that may be performed to orchestrate interactions between multiple constituent services of an application, according to at least some embodiments.

Figure 1:
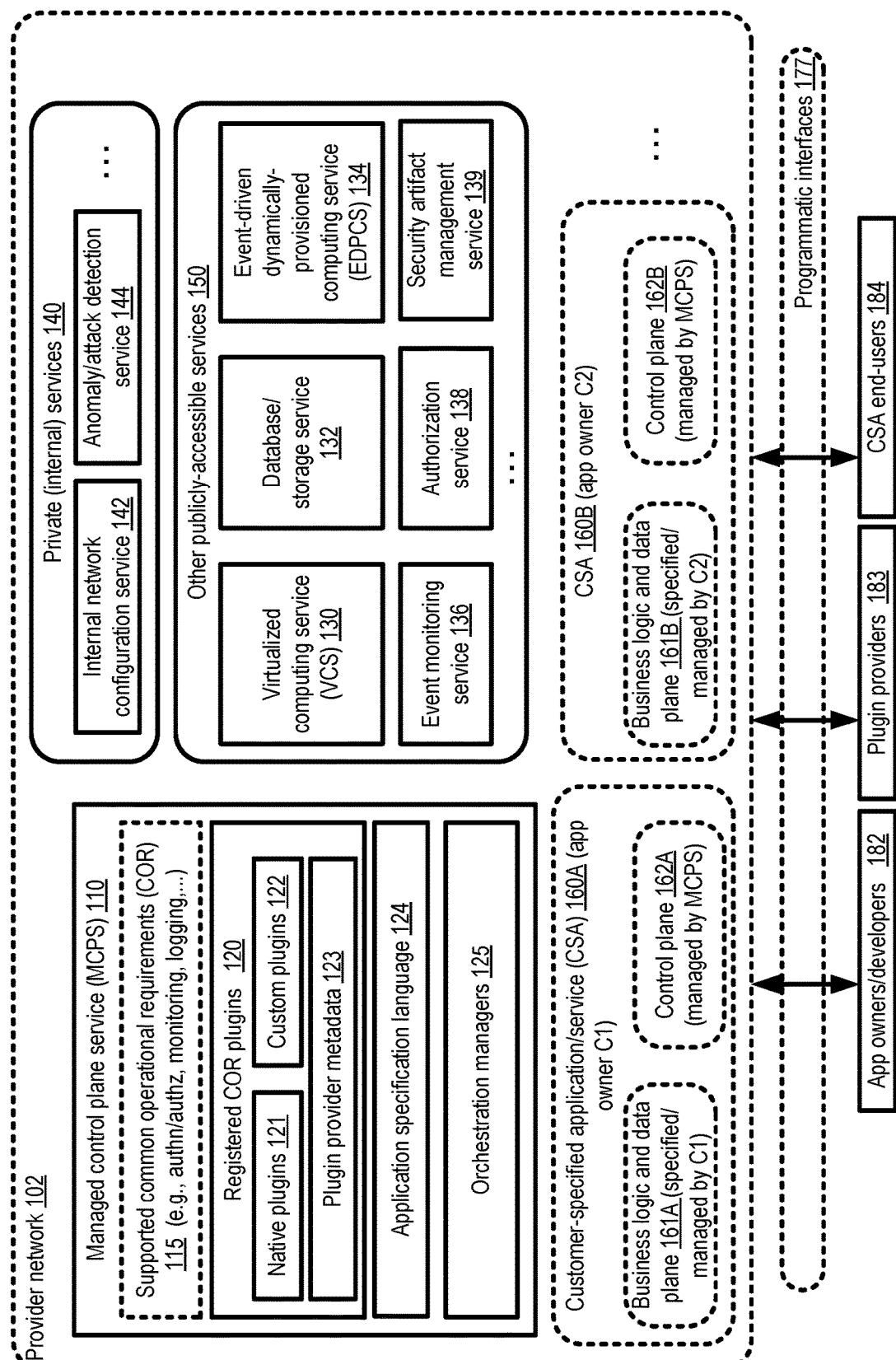
FIG. 1 illustrates an example system environment in which a managed control plane service may be implemented to simplify development, deployment and maintenance of applications at a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for implementing a managed control plane service which simplifies and streamlines the operations required to implement complex applications, including the automated integration of constituent micro-services of multi-service applications. Often, the applications implemented and deployed with the help of such a managed control plane service (MCPS) may be exposed to end users as network accessible services to which requests for application tasks can be submitted via a set of APIs (application programing interfaces); as such, the applications themselves may also be referred to as services.

At a high level, the MCPS may provide at least the following types of assistance to its clients such as application owners or application developers (the individuals or teams who design the applications' internal logic and want to deploy the applications for end users or application customers). Firstly, the MCPS may eliminate the need for application developers to write or provide code for integrating their application with services providing various types of common operational requirements such as logging, monitoring, authorization/authentication and the like. The operational requirements may be referred to as "common" operational requirements (CORs) because they may applicable to numerous applications implemented at a cloud computing environment or provider network; the common operational requirements may in some sense be considered application-independent or application-agnostic. For example, detailed log records may have to be generated and collected for an image processing application implemented at a provider network, a content distribution application implemented at the provider network, a weather forecasting application implemented at the provider network, and so on, regardless of the specific problem domain being addressed. As such, it may be advisable to use well-regarded, thoroughly-tested logging techniques supported for example by a logging service of a provider network or cloud computing environment for all the applications. The MCPS may use constructs referred to herein as plugins to implement the techniques for fulfilling numerous types of CORs for applications, without requiring the application owners to provide code for the CORs. The plugin-based approach may provide an elegant solution to a governance or compliance problem faced collectively by application designers: numerous applications may all have to provide similar behavior with respect to tasks such as logging, authentication/authorization and the like, while best-of-class knowledge and experience with respect to the different common tasks may be distributed across respective groups of experts who may not necessarily be members of the engineering teams responsible for the applications. Using common plugins developed by such experts, their domain expertise with respect to each of the operational requirement categories may be utilized for the benefit of hundreds or thousands of applications.

Secondly, the MCPS may eliminate or reduce the amount of work that has to be performed by application developers if/when requirements of an application change. For example, an existing COR for securing messages associated with an application may change when an improved security algorithm is discovered and chosen by relevant authorities (e.g., by the operators of the provider network, by standards establishment consortia, etc.) for widespread deployment. In such a scenario, instead of requiring all application developers to modify and test respective sets of code to accommodate the new requirement, a single security plugin provider may provide an updated version of a security plugin to the MCPS, and the new version of the security plugin may be transparently deployed by the MCPS for all the applications for which the earlier version of the security plugin was being used, with no application code changes needed. Similar benefits may also be achieved if/when entirely new CORs (for which no previous plugins exist) are identified for a group of applications. Substantial reduction in application developers' workloads may also be achieved with the help of the MCPS if and when new versions of end-user application APIs are introduced—e.g., the MCPS may analyze the new versions and request only the minimum set of logic and/or configuration changes from the application developers.

Thirdly, the MCPS may eliminate or at least reduce the requirements for the application developers to make low-level decisions regarding resources to be used for executing application-specific logic (also referred to as business logic). Instead of requiring application developers to make resource allocation and deallocation decisions, the MCPS may select and/or configure specific resources or computing services to be used based on a logical descriptor of an application provided by the application developer. For example, API handlers and endpoints may be instantiated by the MCPS to receive end user requests, an event-driven dynamically provisioned computing service implementing a functional programming model may be used to implement application-specific logic in response to an end-user API invocation, and so on.

Fourthly, for complex applications designed as a collection of quasi-independent micro-services or constituent services, the MCPS may also eliminate much of the configuration overhead typically associated with orchestrating interactions between the constituent services. In some cases, for example, resources of the MCPS may be configured as hubs in a hub-and-spoke framework in which the individual constituent services (which may themselves be implemented at resources selected by the MCPS) communicate with each other via the MCPS resources rather than directly to each other, thus removing the need for the developers of the different constituent services to write code for integrating the constituent services. The designers of the constituent services may only be responsible for indicating the logic used for their own constituent services, and may (for example) not even be aware that output produced from a particular function or API of a given constituent service is going to be used as input for another function or API of another constituent service; the inter-service interactions may be handled entirely by the MCPS in various embodiments. The MCPS may also comprise components which infer/deduce I/O operations which may be required to store persistent state information of the applications, select storage resources to be used for the state information, enforce transaction boundaries associated with combinations of application sub-operations, and so on.

As one skilled in the art will appreciate in light of this disclosure, certain embodiments may be capable of achieving various advantages, including some or all of the following: (a) reducing the amount of computing, storage, memory and networking resources needed to develop and deploy complex applications in cloud computing environments, (b) enhancing the availability and robustness of such applications, e.g., by employing well-tested subcomponents, developed by domain experts, for various common operational requirements which might otherwise require separate development efforts by less expert teams, and (c) improving the user experience of application developers, e.g., by providing easy ways of specifying applications and automatically verifying that all applicable operational requirements are satisfied for the applications.

In some embodiments, the MCPS may be implemented as one of a suite of services of a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as the MCPS. A VCS may also be referred to as an elastic compute service, virtual machines service, computing cloud service, compute engine, and/or cloud compute in various implementations.

According to some embodiments, a system may comprise one or more computing devices. The computing devices may include instructions that upon execution on or across the one or more computing devices cause the one or more computing devices to store, at an MCPS of a provider network, metadata identifying respective sources of a plurality of common operational requirement (COR) plugins for applications to be implemented using provider network resources. In some embodiments, a COR plugin may indicate (a) at least one application programming interface (API) of a service or application external to the managed control plane service, which is to be invoked to satisfy an operational requirement of an application and/or (b) one or more programs to be executed at the managed control plane service to satisfy the operational requirement. A library or repository of COR plugins, with one or more plugin implementations available for each of several COR categories, may be maintained at the MCPS in various embodiments. Example COR categories supported by the MCPS in some embodiments may include, among others: authorization requirements, metering requirements (e.g., to keep track of the counts of different API calls of an application or other application operations/requests), metrics collection requirements (e.g., to capture metrics regarding resource usage, response times, throughputs, etc.), dashboard requirements (e.g., to enable configurable dashboards showing customizable application status information to be presented to application administrators or users via graphical or web-based interfaces), automated tagging requirements (e.g., to generate tags when new instances of a data object are created, such that the tags can later be used to refer to the objects or to groups of related objects), logging requirements, requirements for integration with isolated virtual networks established at a VCS, data partitioning requirements for state information of the applications, caching requirements for results of various application APIs, security requirements, encryption requirements, configuration constraints compliance requirements, application request throttling requirements, or application cloning requirements, and so on.

The computing devices of the MCPS may obtain a specification of an application, e.g., via a programmatic interface. The specification may indicate one or more end-user APIs of the application, but may not identify or specify a resource to be used for performing a computation in response to an invocation of the one or more end-user APIs. In some embodiments, the end-user APIs may include at least some CRUD (create, read, update and delete) APIs for various types of objects of a data model of the application. In some implementations, an application developer may prepare the application specification (which may also be referred to as an application descriptor) in a declarative language supported by the MCPS and submit the specification to the MCPS. In at least one embodiment, the application specification may indicate one or more object types of the application's data model, and the MCPS may deduce or infer a set of CRUD APIs which may be needed for the object types.

The MCPS may determine or identify a set of COR plugins to be used for the application in some embodiments, e.g., selected from the collection of registered COR plugins. The set of COR plugins needed may differ from one application to another. In response to an invocation of an end-user API of the application, the MCPS may (a) cause one or more computations of the application-specific logic to be performed at a resource selected by the MCPS, (b) cause an API indicated in a particular COR plugin of the set identified for the application be invoked and/or (c) cause a program indicated in the particular COR plugin to be executed at a resource selected by the managed control plane service. Any of a variety of provider network resources may be selected by the MCPS for the API's application-specific logic and/or the COR program in different embodiments: for example, an event-driven dynamically-provisioned computing service may be used, a compute instance of a virtualized computing service may be used, or a software container instantiated at a container service of a provider network may be used.

In response to a determination that an updated version of the particular COR plugin has been generated (e.g., by the corresponding plugin source indicated in the metadata stored by the MCPS), the MCPS may automatically cause the new version to be used in response to subsequent end-user API invocations of the application in various embodiments. For example, if the plugin's API is changed in the updated version, the new version of the plugin's API may be invoked for subsequent invocations of end-user APIs. If the new version of the plugin includes a new program to be executed, the new version of the program may be executed by the MCPS using resources of the MCPS for subsequent invocations of end-user APIs. As a result, changes in CORs (and changes in plugins developed for the CORs) may require little or no work on the part of the application owners/developers.

In some embodiments, at least a subset of CORs or COR plugins to be used for an application may be indicated by an application developer in an application descriptor submitted via the MCPS programmatic interfaces. In one embodiment, the MCPS may in effect provide a menu of supported CORs or plugins via a programmatic interface, and the application developer may use the interface to indicate which specific plugins are to be used for a given application. Different combinations of COR plugins may be used for different applications in various embodiments. In some embodiments, by default, the MCPS may use a set of COR plugins for any application, but an application developer may override the MCPS's choice of plugins if desired using the MCPS's programmatic interfaces.

With respect to the timing of responses to end user requests for which the operations/tasks indicated in COR plugins are initiated, plugins may be divided into two broad categories in various embodiments: synchronous plugins and asynchronous plugins. In the case of a synchronous plugin, when an end user submits a request, results of operations/tasks performed to satisfy the COR may be obtained before the response to the end user's request is provided to the end user, or more generally, before the completion of the application-specific business logic computations which result from the end user's request. In the case of an asynchronous plugin, the timing of at least some of the operations/tasks needed to satisfy the COR may be independent of the timing of the response provided to the end user (or the completion of the application-specific or business logic computations). For example, some of the plugin's work may be begun before the end user is provided the response, but other parts of the work may only be completed sometime after the end user receives the response. In other scenarios, operations indicated in an asynchronous plugin may only be initiated after the end user receives the response or the business logic has been fully executed.

In at least some embodiments, immutable records of various types of events and operations performed at the MCPS may be stored at a log-structured data store. Such immutable records may be used for executing tasks of asynchronous plugins in various embodiments. For example, respective log listeners may be established for one or more asynchronous plugins, which are notified whenever relevant records are added to the data store. Such a listener may detect that a COR fulfillment action/task is needed for a newly-inserted record, and initiate the action or task accordingly.

In various embodiments, the MCPS may require application developers who have submitted application descriptors to perform some follow-on tasks before the application can be deployed. For example, the MCPS may create stubbed-out code templates for application specific logic associated with CRUD APIs of the application, and the application developers may have to populate or fill out the templates with the details of their application-specific logic in one embodiment. Some plugins may also require configuration parameters to be set by the application developers—for example, for a plugin implementing throttling or rate control of end-user API requests, the application developer may have to provide the threshold rate at which the throttling is to be initiated.

In some embodiments, the MCPS may maintain a registry of COR plugins, to which plugin providers may add new plugins or new versions of plugins. The MCPS may implement programmatic interfaces which can be used to submit plugin registration requests, requests for new categories of plugins, and so on. In response to a registration request indicating a new plugin, for example, metadata describing the new plugin and identifying the source or provider of the plugin may be stored by the MCPS. In at least one embodiment, application developers may design/develop custom COR plugins (e.g., for general use, or to be used specifically for their applications) and submit registration requests for the custom plugins. When a new version of a registered plugin is received at the MCPS, in various embodiments the MCPS may verify (e.g., using any of various cryptographic or other security techniques) that the new version was sent by a trusted provider or source whose metadata is present in the registry.

As mentioned above, some applications which are to be deployed with the help of a MCPS may be fairly complex, and may be organized as a collection of collaborating micro-services or constituent services. For example, an application used internally within a virtualized computing service for responding to an end user request to launch a compute instance (e.g., a "run instance" request) may require collaborations between (a) a micro-service responsible for identifying an existing candidate virtualization host for the compute instance, (b) another micro-service that provisions a new virtualization host if needed, (c) another micro-service that generates network configuration settings for the compute instance, (d) another micro-service that ensures that configuration of the proposed compute instance is stored in an idempotent fashion in a metadata store, (e) another micro-service that prepares a response to be sent to the requester of the compute instance, and so on. Respective teams of engineers may generate the application-specific logic of the different micro-services. From the perspective of a given micro-service, the other micro-services may ideally be treated as black boxes with well-defined inter-micro-service interaction signatures (e.g., known input and output data types for messages between the micro-services). There may be no need for one micro-service to be informed about the internal details of any other micro-service. Such an approach may also be referred to as a service-oriented architecture.

In at least some embodiments, in addition to fulfilling common operational requirements (CORs) of the kind described above for the different constituent services of such multi-service applications and for the applications as a whole using plugins, the MCPS may identify resources to be used for different constituent services of such multi-service applications and orchestrate the interactions between the constituent services. One or more programmatic interfaces of the MCPS may be used by application developers/owners to provide a high-level descriptor or specification of a multi-service application to be implemented at a provider network, including for example the input and output data types for various messages which may be exchanged between different constituent services. The descriptor may not necessarily provide an indication of the sequence or order in which different constituent services have to be invoked to respond to a given end-user request in at least some embodiments. The MCPS may analyze the descriptor to determine/identify a plurality of constituent services of the application, as well as the sequence or dataflow of interactions between the constituent services. The dataflow or interaction sequence may be determined, for example, based at least partly on matching input/output data types. In at least some embodiments, the MCPS may generate a respective directed acyclic graph (DAG) indicating a set of inter-service interactions needed to respond to each type of end user request of the application. The MCPS may also identify (e.g., based on contents of the application descriptors, or based on default settings of the MCPS) one or more CORs to be fulfilled for the application, without receiving code for the CORs from the application developer. Any combination of the COR categories mentioned earlier, such as logging, authentication, monitoring, etc. may be selected for the application in different embodiments, at the global or application level and/or at the micro-service level. For example, for a logging COR, log records may have to be stored for application-level events (e.g., receptions of end user requests, completion of processing of end user requests, and so on) as well as for constituent service level events.

The MCPS may initiate or perform configuration operations to enable communications between the different constituent services of the application in various embodiments. The configuration operations may, for example, include assigning respective Internet Protocol (IP) addresses for the different constituent services, setting up network routes for inter-service communications, configuring intermediary resources by which inter-service requests can be processed/transformed/forwarded as needed by the constituent services, and so on in different embodiments. The MCPS may coordinate the processing required for responding to end user requests of the application in various embodiments. The coordination of the processing may include, for example, causing contents (e.g., parameters) of an inter-service request to be populated/generated at a first resource (selected by the MCPS to implement a first constituent service of the application) and received at a second resource (also selected by the MCPS, to implement a second constituent service of the application). The MCPS may orchestrate such communications between micro-services as synchronous operations in some embodiments—e.g., as soon as the input parameters of a request (which is to be fulfilled/processed at a destination constituent service) become available at a source constituent service, the request may be formulated and transmitted by the MCPS to the destination constituent service. In other embodiments, asynchronous communications between constituent services may also or instead be supported by the MCPS. In some cases, the contents of the requests may be re-formatted, transformed or modified by the MCPS. For example, the designers of the source constituent service may not need to be aware of the syntax of requests to the destination constituent service are to be sent; instead, the source constituent service may simply generate output of one of its own APIs, and the MCPS may convert that output into a format which can be consumed as an input request by the destination constituent service. The MCPS may also cause the second resource to generate a response to the inter-service request or communication (which may in turn be provided to the first resource, or to some other resource implementing some other constituent service). In at least one embodiment, the MCPS may orchestrate communications (e.g., comprising different parameters, or overlapping/common parameters) between one source constituent service and multiple destination constituent services; the designer of the source constituent service may not even be aware of the fact that multiple inter-constituent-service requests are being orchestrated by the MCPS. Furthermore, in at least some embodiments, the MCPS may cause state information pertaining to the end user request to be stored at a data store; such persistent state information may be used, for example, by application developers or administrators to follow the progress of various interactions required among the different constituent services for different end user requests. The MCPS may cause various tasks to be initiated, e.g., using one or more COR plugins, to fulfill/satisfy the CORs identified earlier for the application in various embodiments.

MCPS functionality described earlier, such as the transparent rollout of updates of COR plugins, may also be used with equal success for complex multi-service applications. Some COR plugins may be specified by the application developers, while others may be selected by the MCPS in some embodiments. In addition, in at least some embodiments, the MCPS may simplify the way in which changes to application state information schemas are applied. The MCPS may infer a schema to be used to store state information of the application, e.g., based on analysis of the input/output data types indicated in the application specification(s) provided by an application developer in some embodiments. If/when the application developer wishes to change the input/output data types, the application developer may submit a new version of the application specification. In response, the MCPS may determine that the schema used for storing the state information also has to be changed, and make the appropriate configuration changes (e.g., adding/removing columns from a table) at the data stores selected by the MCPS for storing the state information, without requiring any work from the application developer.

The MCPS may implement automated remediation or compensation actions for errors/failures of various kinds in some embodiments, without requiring code for the remediation actions to be provided by application developers. For example, the MCPS may identify one or more cleanup tasks (such as deleting a record from a database table) to be performed in response to a detection of a failure of one or more operations at a constituent service, or in response to partially-completed operations, and initiate such compensation actions when the state information of the application indicates that the failure or partial completion has occurred. In at least some embodiments, the application developer or owner may not specify the compensation or remediation actions, or even the conditions under which the compensation actions are required; instead, the MCPS may infer (e.g., based on transaction boundaries associated with the constituent services) when compensation actions are required, which objects have to be cleaned up or deleted, etc.

In various embodiments, the MCPS may provide programmatic interfaces which can be used by application developers or administrators to override default MCPS behaviors. For example, instead of allowing the MCPS to deduce/infer a schema for application state information, in some embodiments an application developer may specify the schema to be used. Similarly, application developers may use such interfaces to indicate custom programs or plugins to be used for satisfying CORs, instead of the plugins in the MCPS's registry. As such, the extent to which an application developer wishes to rely of the MCPS's automated/default features may be left up to the application developer. Some application developers may provide a minimal required amount of information (e.g., the application-specific logic for responding to various end user APIs) in their interactions with the MCPS, and let the MCPS decide all other aspects of their application's deployments. Other application developers may provide many more details and rely to a lesser degree on MCPS default behaviors.

Example System Environment

FIG. 1 illustrates an example system environment in which a managed control plane service may be implemented to simplify development, deployment and maintenance of applications at a provider network, according to at least some embodiments. As shown, system 100 comprises resources and artifacts of numerous network-accessible services of a provider network 102, including publicly-accessible managed control plane service (MCPS) 110, a collection of other publicly-accessible services 150 and a collection of private services 140. Each of the services 110, 140 and 150 may be implemented using some combination of software and hardware of one or more computing devices in the depicted embodiment. Publicly-accessible services may implement programmatic interfaces (such as APIs, web-based consoles, command-line tools and the like) which can be utilized by service clients from devices external to the provider network (e.g., from various Internet-connected devices). Private or internal services 140 may not expose such interfaces outside the provider network 102, but may provide programmatic interfaces that can be used by services running within the provider network. Private services 140 may, for example, comprise one or more internal network configuration services 142 (used to set up and link isolated virtual networks for different provider network clients), anomaly/attack detection services 144, and so on. Other publicly-accessible services 150 may include a virtualized computing service (VCS) 130, database/storage services 132, event monitoring service 136, authorization service 138, security artifact management service 139, event-driven dynamically-provisioned computing service (EDPCS) 134, and so on. Each of the services 140 and 150 of the provider network may have been in use for many years, e.g., on behalf of hundreds of thousands of customers, and may thus have incorporated lessons learned from a vast experience base to provide best-of-breed functionality. The MCPS 110 may utilize one or more of the other publicly-accessible services 150 and/or private services 140, e.g., to execute application-specific logic of one or more customer-specified applications (CSA) such as CSA 160A or CSA 160B in the depicted embodiment. In addition, in at least some embodiments, services 140 or 150 may be used to perform plugin tasks to fulfill various types of common operational requirements (CORs) of the different CSAs.

Generally speaking, the operations and network traffic of the publicly and privately accessible services of provider network 102 may broadly be subdivided into two categories in various embodiments: control plane operations carried over a logical control plane and data plane operations carried over a logical data plane. While the data plane represents the movement of user data, the control plane represents the movement of control signals. The control plane of a given service generally includes one or more control plane components distributed across and implemented by one or more control servers. Control plane traffic generally includes administrative operations, such as system configuration and management (e.g., resource placement, hardware capacity management, diagnostic monitoring, system state information and the like). The data plane includes customer resources that are implemented on the provider network 102 (e.g., computing instances, containers, block storage volumes, databases, file storage and the like). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks in at least some embodiments.

Each of the CSAs 160 may also be considered a respective higher-level network-accessible service in various embodiments, built on top of the provider network's existing services. For example, programmatic interfaces analogous to those of services 150 or 140, such as web service APIs, REST (representational state transfer) APIs or the like may be used by end users of the CSAs 160, just as similar programmatic interfaces may be used by clients of services 150 or 140. As such, each CSA may also require its own control plane and data plane functionality in various embodiments. The MCPS 110 may facilitate the implementation of the control plane portions of the CSAs 160 in different embodiments, e.g., by removing the responsibilities for tasks such as resource selection/provisioning, fulfillment of CORs, orchestration of interactions between subcomponents of the CSAs, and so on. The clients of the MCPS 110 may include application owners/developers who wish to utilize the rich resources and features of various provider network services for their applications while also offloading much of the mundane control plane functionality for their applications, leaving the application owners/developers free to concentrate on the business logic of their applications. For CSA 160A, owned/developed by a client C1 of the MCPS 110, for example, the business logic and data plane resources 161A may be specified/managed by the client C1, while the control plane 162A may be managed by the MCPS. Similarly, for CSA 160B, owned/developed by a client C2 of the MCPS 110, the business logic and data plane resources 161B may be specified/managed by the client C2, while the control plane 162B may be managed by the MCPS.

Over the years, numerous best-of-breed control plane implementation techniques may have been identified by the engineering teams responsible for the services 140 and 150, and such techniques may be employed on behalf of MCPS clients in the depicted embodiment. For example, the MCPS 110 may store metadata pertaining to a plurality of supported common operational requirements (CORs) 115 which have been found to be applicable across many different services and applications. Such CORs 115 may include, among others, authorization/authentication, metering, events/metrics collection and display (e.g., via customizable dashboards), caching (e.g., of results of common queries pertaining to control plane objects/events), automated tagging, logging, integration with isolated virtual networks set up on behalf of provider network clients, data partitioning/sharding, security artifact and encryption management, compliance with customer-specified resource constraints/limits, throttling of API requests, repeatable deployment or cloning of applications, and so on.

Corresponding to individual ones of the supported CORs, the MCPS may obtain one or more constructs referred to as plugins in the depicted embodiment, which can be easily incorporated within CSA control planes 162 to ensure that the corresponding CORs are fulfilled or satisfied. Several different types of plugins may be used in different embodiments, as described below in further detail. Some plugins may indicate one or more APIs of other services (e.g. APIs of authorization service 138, event monitoring service 136, etc.) which are to be invoked from the MCPS to satisfy the corresponding COR. Other plugins may also indicate programs or tasks to be performed using computing devices of the MCPS itself, e.g., in addition to or instead of invoking APIs of services other than the MCPS.

A repository or library of registered COR plugins 120 may be maintained at the MCPS in the depicted embodiment. The registered COR plugins 120 may comprise some number of native plugins 121 and some number of custom plugins 122 in the depicted embodiment. Native plugins 121 may be provided out-of-the-box by the MCPS and may be generally available for CSAs 160 of any client. Native plugins may be obtained at the MCPS 110 from a set of trusted plugin providers in various embodiments, e.g., comprising engineers/developers responsible for or associated with some of the services 150 or 140. Custom plugins 122 may have been submitted by clients of the MCPS, e.g., for use with their own CSAs, or for CSAs of some agreed-upon group of MCPS clients. Plugin provider metadata 123 may also be stored at the MCPS, identifying the sources from which the native and/or custom plugins were received.

The MCPS 110 may support a declarative application specification language 124 in the depicted embodiment, enabling CSA developers/owners to submit logical descriptors or specifications of their applications. Such descriptors may, for example, indicate a set of end-user APIs (e.g., create/read/update/delete or CRUD APIs) which can be invoked by end users of the CSAs, but may not specify the specific computing resources (or even the types of resources) to be used to implement the business logic or application-specific logic associated with the APIs. In some embodiments, the application descriptors may simply specify the types of data objects to be used in the CSAs, and the APIs needed to manage the data objects may be inferred/deduced at the MCPS. The MCPS 110 may also include one or more orchestration managers 125 in the depicted embodiment, responsible for selecting specific resources or services to be used to implement the business logic of the CSAs and/or the resources to be used to perform tasks indicated in the plugins. For complex CSAs, which comprise a plurality of interacting lower-level constituent services, the orchestration managers 125 may also manage the message flows between the constituent services, e.g., without requiring integration-related code to be provided by application developers in at least some embodiments.

Programmatic interfaces 177 of the MCPS and the CSAs may include, for example, web-based consoles, graphical user interfaces, command-line tools, APIs and the like. Using such interfaces, messages from at least three types of entities may be exchanged with client devices (e.g., desktops, laptops, mobile devices such as phones/tablets, etc.) in the depicted embodiment. Application owners/developers 182 may submit CSA descriptors or specifications in language 124 to the MCPS 110 via interfaces 177, as well as requests to deploy the CSAs. Plugin providers 183 may submit new plugins (e.g., in plugin registration requests) or updated versions of existing plugins. CSA end users 184 may submit their application-specific requests (e.g., using APIs indicated in the CSA descriptors defined by the application owners) to the CSAs 160. Corresponding responses may be provided via the programmatic interfaces 177 for at least some types of requests received by the MCPS 110 or by the CSAs 160. In at least some embodiments, programmatic interfaces 177 may be used by application developers to fill out templates (generated by the MCPS 110) of business logic corresponding to various APIs of their respective CSAs, and/or to provide configuration parameters for plugins to be used for their CSAs.

In various embodiments, one or more computing devices of the MCPS 110 may receive a descriptor which indicates one or more end user APIs of a CSA 160 (e.g., either by listing the APIs, or by providing information about application data object names which can be used to infer the APIs) via the programmatic interfaces. The MCPS devices may determine a set of registered COR plugins 120 to be used for CORs applicable to the CSA. At least some of the CORs (or the plugins themselves) may be indicated in the descriptors in some embodiments. One or more COR plugins may be selected by the MCPS in various embodiments, e.g., without receiving explicit guidance from the application developer. The MCPS may request the application developer to fill out or populate needed business logic details and/or COR plugin parameters before the CSA can be successfully deployed in various embodiments. One or more network endpoints may be configured by the MCPS to receive end user requests of the CSA. After all the needed information has been received, the CSA may be designated as ready for deployment, and a message indicating this may be sent to the application developer by the MCPS.

In response to a deployment request, the CSA may be activated or "switched on" by the MCPS 110 in the depicted embodiment—that is, the endpoint(s) set up for receiving the end user requests may be instructed to start processing end user requests. In response to a given end user request (e.g., an invocation of a CRUD API of the CSA by an end user), the MCPS may cause one or more computations to be performed at a resource (e.g., the EDPCS 134, a compute instance of the VCS, or a software container implemented at a container service of the provider network) selected by the MCPS. The EDPCS 134 may implement a functional programming model in the depicted embodiment, such that the specific computing device to be used for implementing a given function is chosen after the request for executing the function is received; in contrast, compute instances of the VCS 130 may be provisioned and allocated ahead of time for specific clients, and used for computations only after they have been allocated and brought online. The MCPS may be described as providing "server-less" control plane implementations in various embodiments, as the decisions regarding the resources to be used for control plane computations of various applications may be made at the MCPS, relieving the application developers/owners of responsibilities for selecting, provisioning and maintaining resources. Results of some computations may be stored at a database/storage service 132 in some embodiments.

In response to the end user request, the MCPS 110 may also cause one or more APIs indicated in a particular COR plugin be invoked, and/or a program or task indicated in the particular COR plugin to be executed at a resource selected by the MCPS. Some of the APIs indicated in the plugins may be directed to other provider network services such as authorization service 138 (which may be used by an authorization/authentication plugin), event monitoring service 136 (which may be used by a monitoring plugin), security artifact management service 139 (which may be used by a security plugin), internal network configuration service 142 (which may be used by a plugin for integration with isolated virtual networks), or anomaly/attack detection service 144 (which may also be used by a security plugin). If and when a plugin provider 183 submits a new version of an existing registered COR plugin, the update may be rolled out by the MCPS 110 without requiring any coding on the part of the application developers. The new versions of the plugin API or programs/tasks may simply be used by the MCPS 110 in response to subsequent end user requests.

Common Operational Requirement Categories

Figure 2:
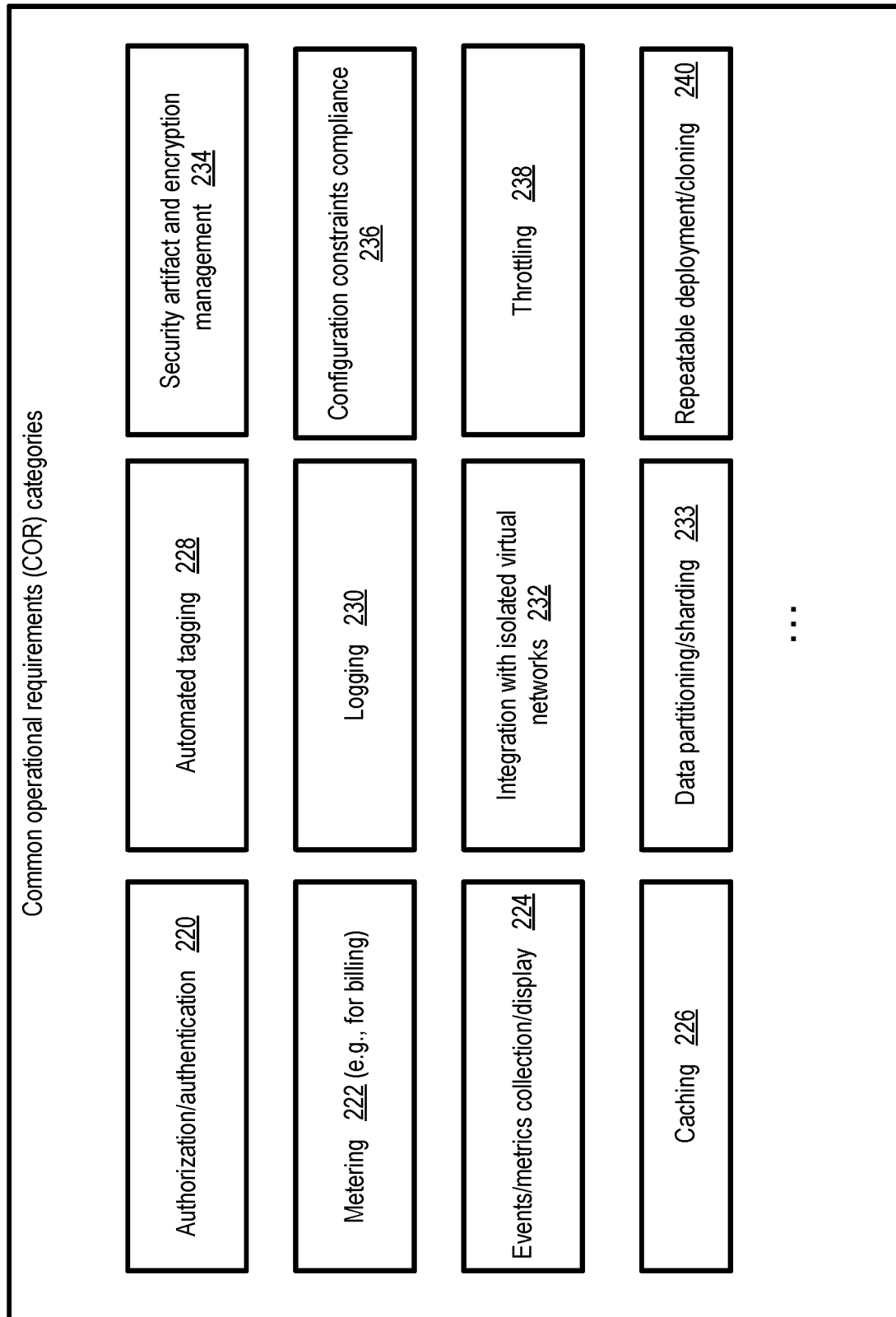
FIG. 2 illustrates example categories of common operational requirements which may be applicable to a variety of applications, according to at least some embodiments.

FIG. 2 illustrates example categories of common operational requirements which may be applicable to a variety of applications, according to at least some embodiments. Respective plugins for each of the different categories may be identified and/or registered at an MCPS similar to MCPS 110 of FIG. 1 in various embodiments. the With respect to authorization/authentication 220, standard and thoroughly tested techniques for authenticating and authorizing end user requests may be implemented by the MCPS using plugins. In at least some embodiments, an authorization service of the provider network at which the MCPS is implemented may support authorization roles, capabilities, groups, and the like, as well as specific algorithms to be used for digital signatures of APIs, and the plugins used for authorization/authentication may use such features of the authorization service.

In some embodiments, various publicly-accessible services of the provider network may charge their clients on the basis of measurements collected with the help of a metering service (e.g., clients may be billed $X for up to N1 API requests per minute). Requirements for metering 222 of customer-specified applications (CSAs) may be satisfied using plugins which use APIs of the metering service in some embodiments.

The collection and display (e.g., via customizable graphical dashboards) of various types of metrics and events associated with CSAs, may represent another example of a requirement which may be shared by numerous applications implemented at a provider network. In some embodiments, plugins used for events/metrics collection/display 224 may use existing metrics management services of the provider network.

Caching 226 and data partitioning/sharding 233, e.g., of state information pertaining to CSA end user APIs, may help to improve the overall performance achieved for various types of end user requests in different embodiments. One or more storage and/or database services of a provider network may provide excellent solutions for caching and partitioning, and such solutions may be utilized by plugin providers.

In at least some embodiments, some MCPS clients may use resources such as compute instances of a virtualized computing service (VCS) for various purposes. The MCPS clients may wish to establish connectivity between their compute instances and the CSAs being set up for the clients. In one embodiment, respective isolated virtual networks (IVNs) may be established on behalf of various clients at the VCS, and the MCPS clients' compute instances may be configured as part of such IVNs. An isolated virtual network may comprise a collection of networked resources (including, for example, compute instances) allocated to a given client, which are logically isolated from (and by default, inaccessible from) resources allocated for other clients in other isolated virtual networks. The VCS client on whose behalf an IVN is established may be granted substantial flexibility regarding network configuration for the resources of the IVN—e.g., private IP addresses for application compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. In some embodiments in which interconnectivity or integration with isolated virtual networks 232 is desired for a CSA, the corresponding plugins may use internal networking configuration services of the provider network.

Automated tagging 228 involves creating user-friendly tags to data objects created as part of a CSA. Such tags may be used later, for example, to perform configuration operations on groups of similarly-tagged objects, instead of having to perform the configuration operations one at a time. Plugins for logging 230 may utilize logging services of a provider network in some embodiments.

Security artifacts such as digital certificates, encryption keys and the like may be needed for various types of operations performed using CSAs in different embodiments. Plugins for security artifact and encryption management 234 may use existing security related services of a provider network in some embodiments. Throttling 238 refers to techniques to avoid overloading of resources used for CSAs by limiting the rate at which requests for different types of operations are accepted.

In some embodiments, application developers may wish to enforce certain configuration constraints on their applications (e.g., all computing resources involved may have to use a specified version of an operating system or software stack). A provider network service which supports configuration constraints compliance 236 may be used for the corresponding plugin in the depicted embodiment. Some CSAs may be required to be easily replicable—e.g., after a given instance or example of the CSA has been set up within a certain geographical region, the CSA owner may wish to replicate or clone the CSA in another geographical region. One or more plugins that facilitate such repeatable deployment/cloning 240 may be used by the MCPS in some embodiments.

Figure 3:
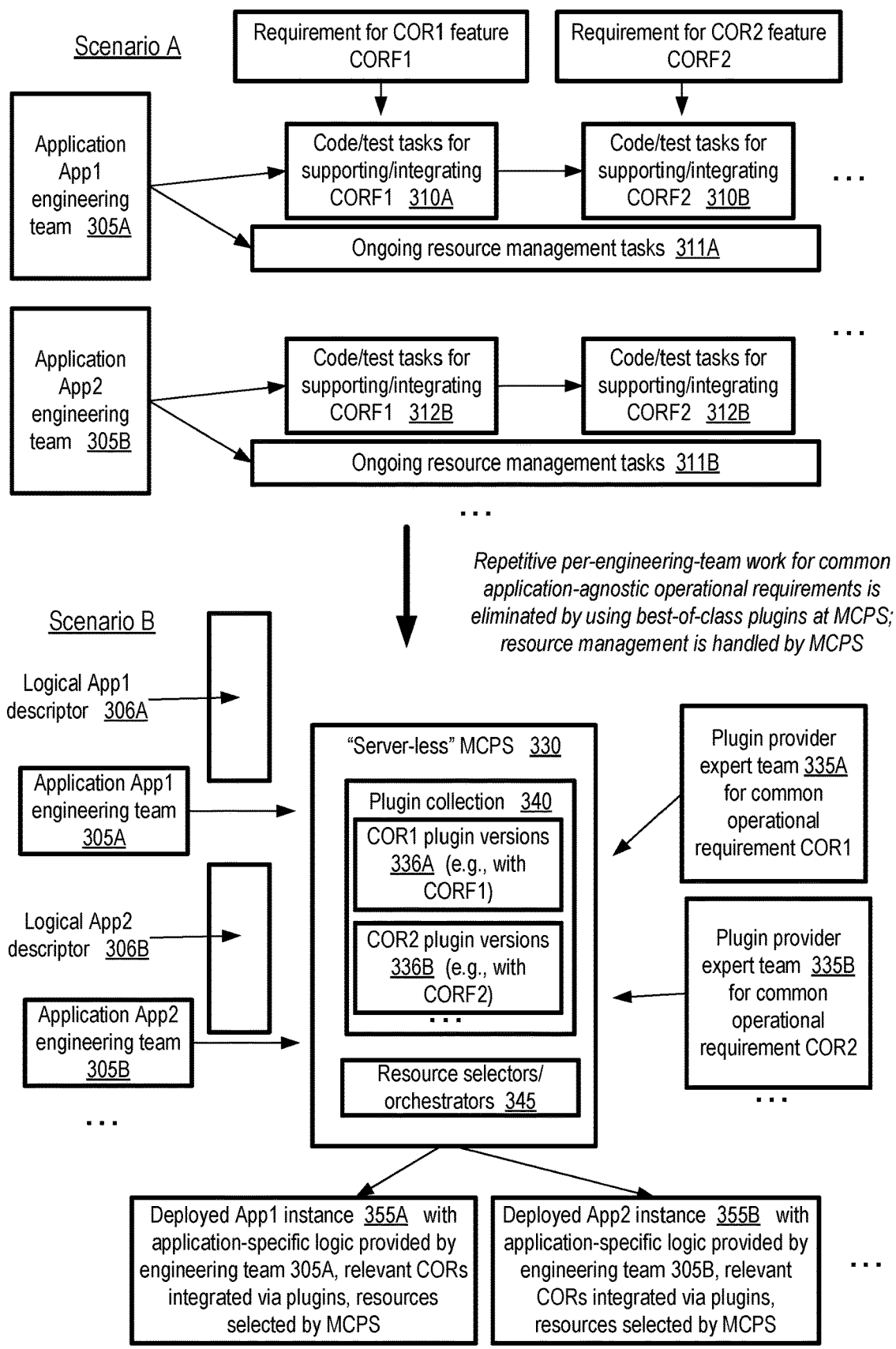
FIG. 3 illustrates a high-level overview of some of the benefits of using a managed control plane service, according to at least some embodiments.

FIG. 3 illustrates a high-level overview of some of the benefits of using a managed control plane service, according to at least some embodiments. Scenario A illustrates a traditional approach in which an MCPS is not utilized for applications App1 and App2. As such, an engineering team 305A assigned to App1 may be responsible for at least two types of tasks in addition to the design of the application-specific business logic of App1: the selection of resources at which the application-specific logic is to be executed, and the coding, testing and implementation of COR features applicable to App1. Similarly, an engineering team 305B assigned to App2 may be responsible for at least two types of tasks in addition to the design of the application-specific business logic of App2: the selection of resources at which the application-specific logic of App2 is to be executed, and the coding, testing and implementation of COR features applicable to App2. Ongoing control plane resource management tasks 311A and 311B may be performed throughout the lifetime of the applications App1 and App2 respectively by engineering teams 305A and 305B in the depicted. In addition, as and when new or updated COR features have to be deployed, each of the engineering teams 305 may be required to produce code for the new features, test the new features, and so on, even though very similar work also has to be done at each service. Thus, when a new feature CORF1 of a particular COR category COR1 has to be incorporated into App1 and App2, code/test tasks 310A for supporting or integrating CORF1 may be required from team 305A, and (conceptually very similar) code/test tasks 312B for supporting or integrating CORF1 may be required from team 305B. Similarly, when a new feature CORF2 of COR category COR2 has to be incorporated into App1 and App2, code/test tasks 310B for supporting or integrating CORF2 may be required from team 305A, and (conceptually very similar) code/test tasks 312B for supporting or integrating CORF2 may be required from team 305B.

In scenario B, in contrast, much of the burden of resource management and COR support may be removed from the engineering teams with the help of a server-less MCPS 330. As mentioned earlier, the MCPS may be described as "server-less" because MCPS clients do not have to concern themselves about selecting or managing the specific computing devices on which their control plane operations are to run. The engineering teams 305 only have to provide logical descriptors 306 (e.g., 306A and 306B for App1 and App2 respectively) of their respective applications. In at least some embodiments, the server-less MCPS 330 may generate code templates for each application based on the analysis of the application descriptors 306, and request the application engineering teams to fill out the templates with their respective application-specific logic details.

The server-less MCPS 330 may obtain COR plugin versions from plugin provider expert teams 335, e.g., team 335A for COR1 and team 335B for COR2. A plugin collection 340 may be maintained at the MCPS 330, with COR1 plugin versions 336A, COR2 plugin versions 336B, and so on. When a new feature is to be supported for any of the COR categories (such as CORF1 or CORF2), or if an entirely new COR has to be supported, corresponding plugin versions may be obtained at the MCPS 330, added to the collection 340, and automatically deployed for the applications at which they are needed. Resource selectors/orchestrators 345 may be responsible for identifying the resources to be used for the application-specific logic and/or the tasks indicated in the plugins used for each of the applications such as App1 and App2. Deployed App1 instance 355A may comprise application-specific logic provided by engineering team 305A, with relevant CORs integrated via plugins, and execution/storage resources selected by the MCPS. Similarly, deployed App2 instance 355B may comprise application-specific logic provided by engineering team 305B, with relevant CORs also integrated via plugins, and execution/ storage resources also selected by the MCPS. Thus repetitive per-engineering-team work for common application-agnostic operational requirements is eliminated using best-of-class plugins at MCPS 330, and resource management details are also handled by the MCPS 330. The engineering teams 305 can focus on their core competence: their application's business logic. In at least some embodiments, indications of the available set of COR plugins in plugin collection 340 may be provided to MCPS clients such as engineering teams 305 via programmatic interfaces, in effect indicating a menu of available plugins, and the engineering teams may choose one or more plugins for their applications. The clients may indicate plugins of their choice in the logical application descriptors 306 in some embodiments, or use other programmatic interactions to indicate selected COR plugins.

Figure 4:
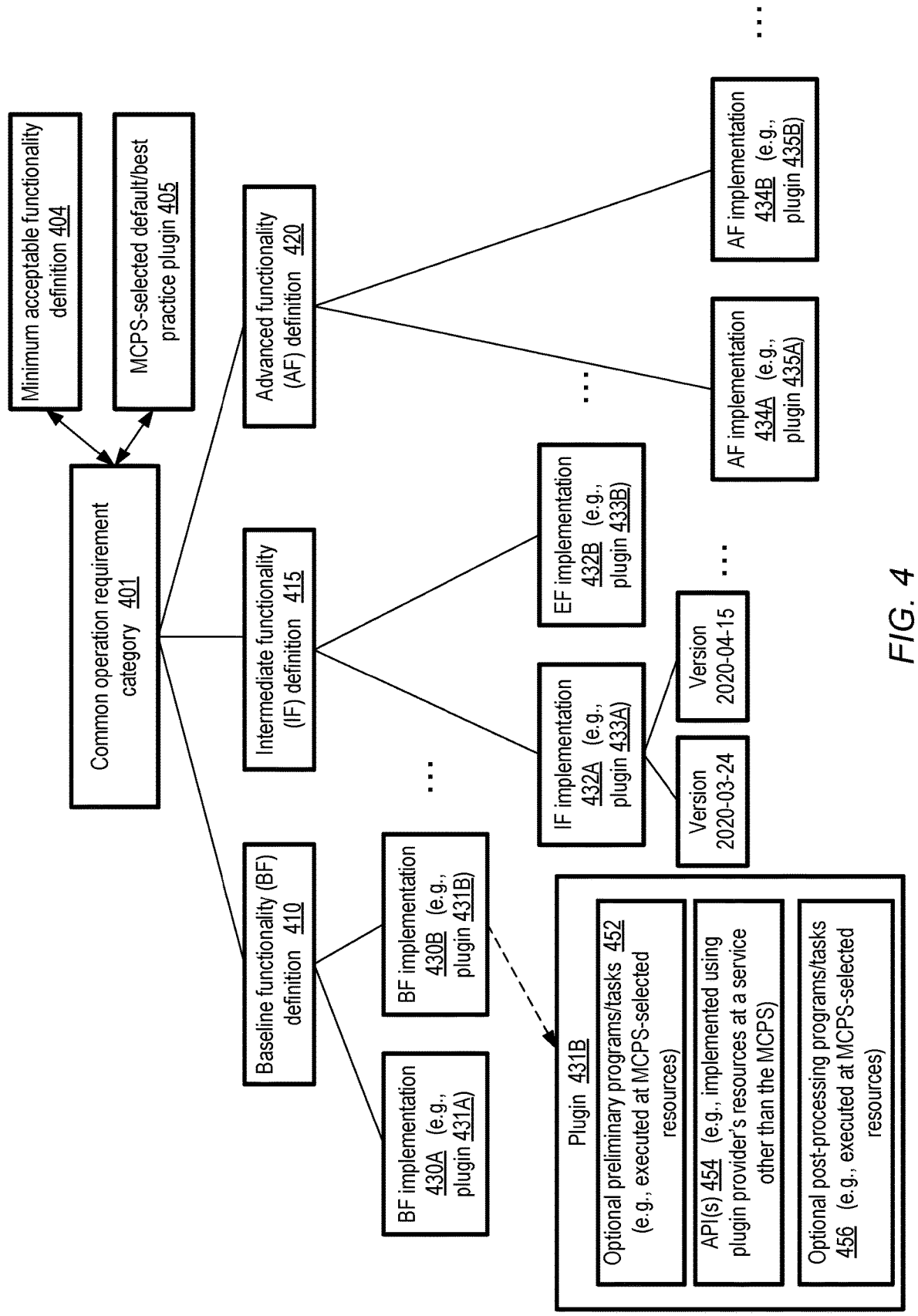
FIG. 4 illustrates example metadata which may be stored with respect to a given common operational requirement category at a managed control plane service, according to at least some embodiments.

FIG. 4 illustrates example metadata which may be stored with respect to a given common operational requirement category at a managed control plane service, according to at least some embodiments. For a given COR category 401, in some embodiments a minimum acceptable functionality definition 404 may be stored at an MCPS, indicating that while different versions of plugins for the COR category 401 may be used for different applications, each such plugin must provide a minimum set of features indicated in the definition 404. For some COR categories, several different levels of functionality may be supported, such as baseline, intermediate an advanced functionality. For example, for an encryption COR, the baseline level may require messages sent/received at the application to be encrypted using a relatively lightweight encryption algorithm, while progressively more sophisticated algorithms may be used for intermediate and advanced encryption support. Respective definitions 410, 415 and 420 may be stored for baseline functionality (BF), intermediate functionality (IF), advanced functionality (AF) in the depicted embodiment.

Corresponding to a given level-specific functionality definition 410, 415 and 420, one or more plugins representing respective implementations of the COR at that level may be stored at the MCPS in some embodiments. In at least some embodiments, a number of different plugin providers may in effect compete with one another—e.g., they may each submit registration requests to the MCPS for their particular plugin implementations corresponding to a published COR functionality definition, and the MCPS may add their plugin implementations to its collection if they satisfy registration criteria. Thus, implementations 430A, 430B, 432A, 432B, 434A, and 434B may comprise plugins 431A, 431B, 433A, 433B, 435A and 435B respectively in the depicted example. A given plugin may in turn have several versions over tome, such as versions 2020-03-24 and 2020-04-15 of plugin 433A. In some embodiments, clients of an MCPS (such as application owners/developers) may develop and submit their own plugins for various COR categories to the MCPS, and such plugins may be added to the MCPS collection either for general use (e.g., to be shared across applications of multiple clients) or for limited use (e.g., to be used only for applications specified by the submitter).

A given plugin such as 431B may comprise several elements in some embodiments. The plugin may, for example, indicate one or more optional preliminary programs/tasks 452 to be executed using MCPS-selected resources, one or more APIs 454 and/or one or more optional post-processing programs/tasks 456 also executed at MCPS-selected resources. The APIs 454 may result in computations or tasks implemented using the plugin provider's resources in at least some embodiments, e.g., at a service other than the MCPS. For example, with respect to a logging COR plugin, the preliminary tasks 452 may involve collecting some number of records of application API invocations at MCPS resources, and an API 454 of a logging service of the provider network may be invoked as part. In the case of a metrics collection and display COR plugin, one or more APIs 454 of a metrics collection service of a provider network may be invoked from the plugin, and the post-processing tasks may comprise transmitting a data set that can be used to display some set of recent metrics on a client device, and so on.

In at least some embodiments, the metadata stored at an MCPS with respect to a COR category 401 may include an MCPS-selected default or best practice plugin 405, which may be employed for an application if (a) the MCPS determines that the COR category applies to the application and (b) the owner of the application does not specify any particular plugin for that COR category. Note that in at least one embodiment, different levels of functionality (BF, IF or AF) may not necessarily be defined for one or more COR categories, and/or multiple plugin implementations may not necessarily be available to an MCPS.

Synchronous Vs. Asynchronous COR Plugins

Figure 5:
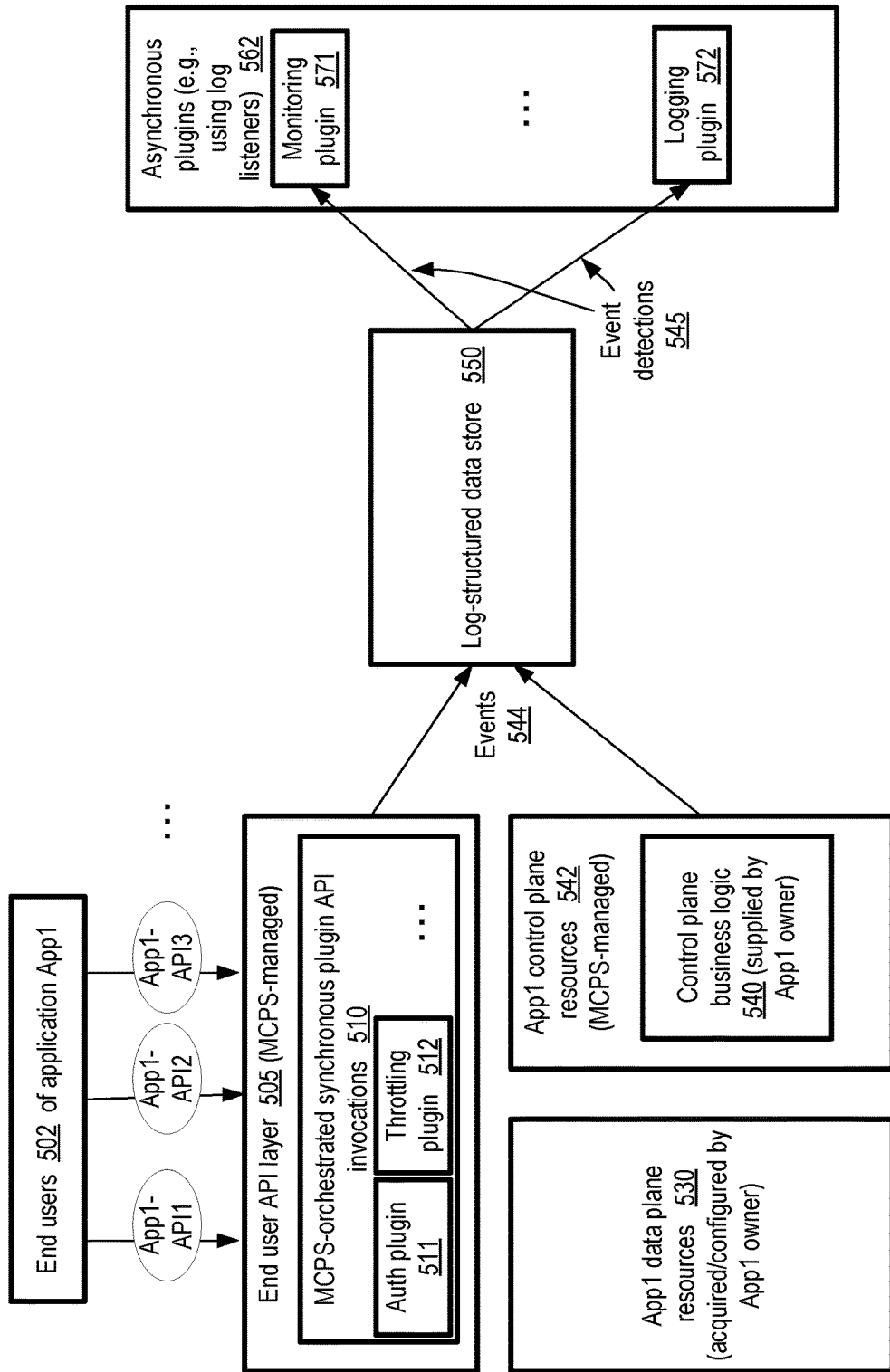
FIG. 5 illustrates an example use of a combination of synchronous and asynchronous plugins for an application, according to at least some embodiments.

FIG. 5 illustrates an example use of a combination of synchronous and asynchronous plugins for an application, according to at least some embodiments. As indicated earlier, plugins may be used to satisfy CORs associated with end user requests of applications in various embodiments (e.g., authentication/authorization of end-user requests may be accomplished using an authorization plugin, logging of end user requests may be accomplished using a logging plugin and so on). With respect to a given end user request, a plugin may be described as being synchronous if the work done to satisfy the corresponding COR is completed before the response to the given end user request is provided (in scenarios in which responses are provided), i.e., before the processing of the end user request is completed). Plugins whose operations can be completed after the processing of the end user request is completed and a response (if needed) is provided to the submitter of the request may be described as an asynchronous plugin.

In the example scenario shown in FIG. 5, an application App1 has a number of end-user APIs, such as App1-API1, App1-API2, App1-API3 which can be invoked by end users 502. The MCPS may configure a set of resources (e.g., network endpoints with respective IP addresses, compute instances or servers to obtain and parse the contents of the end user API requests, and so on) for end user API layer 505 of the application App1. The MCPS may determine which specific COR plugins are to be used for various end user APIs of App1 in the depicted embodiment, e.g., based on the contents of an application descriptor provided by the owner of App1 and/or based on default settings of the MCPS. Some of the plugins may be synchronous, while others may be asynchronous.

When an end user API of App1 is invoked, some number of APIs indicated in synchronous COR plugins may be invoked, e.g., in a sequence selected by the MCPS (or in parallel) in the depicted embodiment. For example, such MCPS-orchestrated synchronous plugin API invocations 510 may include invocations of APIs of an authorization plugin 511, a throttling plugin 512, and so on. In some embodiments, an event-driven dynamically-provisioned computing service (similar to EDPCS 134 of FIG. 1) may be used to invoke the synchronous plugin APIs. The results of the synchronous plugin APIs may be obtained at the end user API layer 505—e.g., an indication that the end user request is authorized/authenticated may be received in response to the invocation of the authorization plugin's API, an indication that the end user request does not have to be dropped/rejected may be received in response to the invocation of the throttling plugin's API, and so on. Control plane business logic 540 corresponding to the end user request (supplied, for example, by App1's owner/developer in response to a template-filling request sent by the MCPS) may then be executed at App1 control plane resources 542 selected and managed by the MCPS. In some embodiments, the event-driven dynamically-provisioned computing service (similar to EDPCS 134 of FIG. 1) may be used to implement at least some of the business logic; in other embodiments, a compute instance or a software container may be used. In at least some embodiments, depending on the nature of the end user request, a response may be provided to the submitter of the end user request from the end user API layer 505 after the business logic has been executed and the synchronous plugin APIs have been invoked. Note that App1 data plane resources 530 may be acquired and configured by App1's owner in the depicted embodiment, e.g., as part of the business logic 540. For example, if a database table is to be used to store App1 user-generated data, such a table may be configured in the business logic using a data store selected by App1's owner/developer.

Records of events 544 associated with the end user request (e.g., a record indicating when the request was received and from where, respective records indicating the results of various synchronous plugin API invocations, records pertaining to the business logic 540, etc.) may be added to a log-structured data store 550 in the depicted embodiment. The log-structured data store 550 may be selected by the MCPS to store immutable, durable records of control plane operations of various applications—thus, records pertaining to other applications may also be stored in the same data store. To implement asynchronous plugins, respective listeners may be configured in the depicted embodiment, which detect or are notified about event records added to the log-structured data store 550. In response to such an event detection 545, a given plugin may initiate one or more operations asynchronous to the end user request which led to the insertion of the record of the event. Thus, for example, a logging plugin 572 may extract a set of information from a detected event record pertaining to App1 and invoke an API of a logging service of the provider network using the extracted information, a monitoring plugin 571 may extract a different set of information from some other detected event record pertaining to App1 and invoke an API of a monitoring service of the provider network, and so on. Using the log-structured data store and associated listeners, the work required to satisfy the CORs corresponding to asynchronous plugins may be scheduled independently of the processing of the end user requests of App1—e.g., by the time a record of the end user request is stored at the logging service, the end user request may already have been completed. In some embodiments, a given COR may require both synchronous and asynchronous operations. In such cases, separate plugins may be used for the synchronous and asynchronous operations, or a hybrid synchronous-and-asynchronous plugin may be used.

Example Timelines

Figure 6:
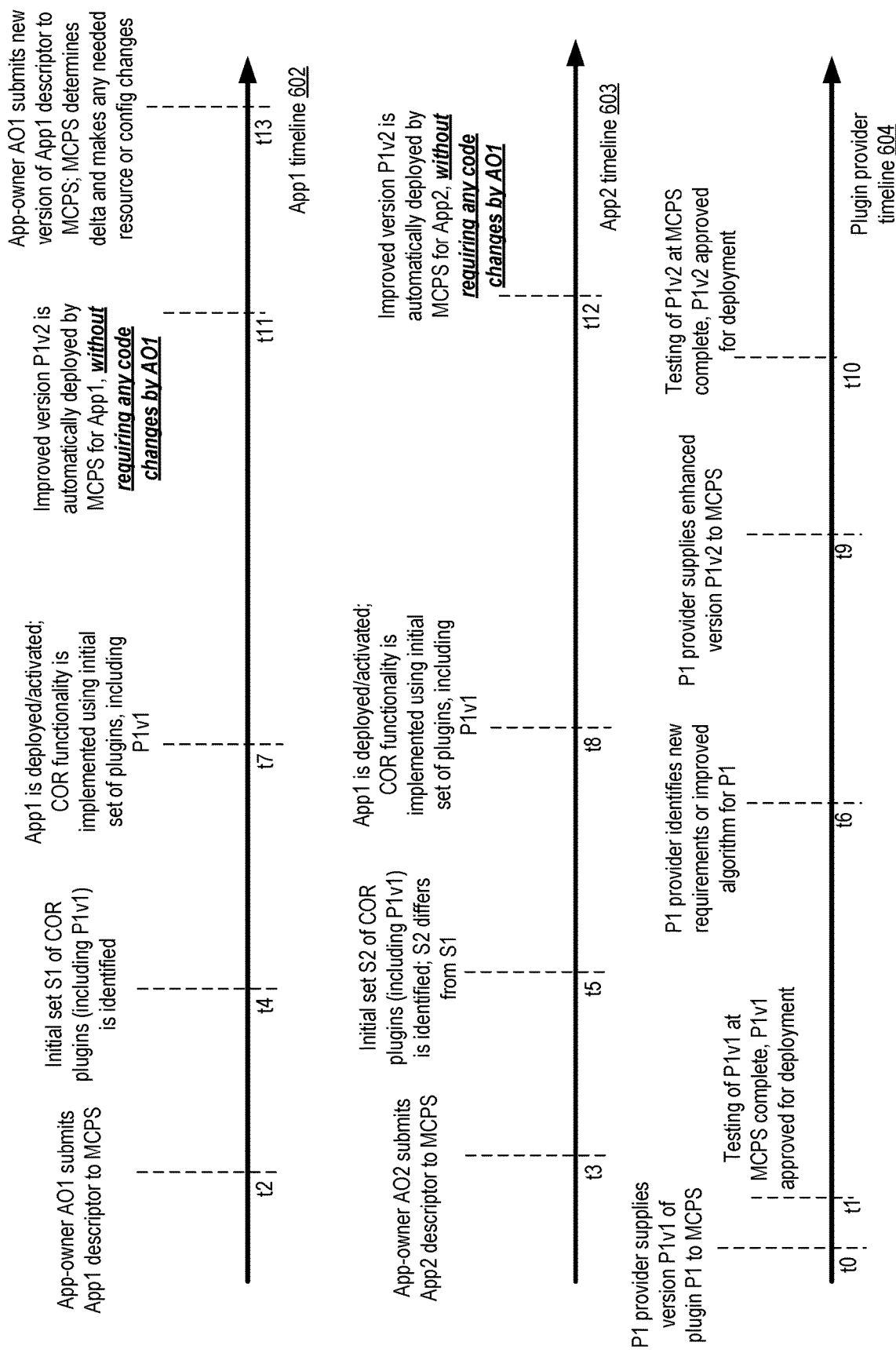
FIG. 6 illustrates respective event timelines associated with a pair of applications implemented with the help of a managed control plane service, according to at least some embodiments.

FIG. 6 illustrates respective event timelines associated with a pair of applications implemented with the help of a managed control plane service, according to at least some embodiments. Respective timelines 602 associated with the lifecycle of applications App1 and App2 are shown, along with a timeline 604 from the perspective of a provider of a particular COR plugin P1. At time t0 along timeline 604, the plugin provider supplies a version P1v1 of plugin P1. P1v1 may be thoroughly tested at the MCPS; after the testing is complete, at time t1, P1v1 may be approved for deployment by the MCPS.

At time t2 along timeline 602, application owner AO1 of App1 submits an App1 descriptor to the MCPS. At time t4, the initial set of COR plugins S1 to be used for App1, including P1v1, is identified by the MCPS, and at time t7, App1 is deployed/activated using resources selected at least in part by the MCPS. COR functionality for App1 is implemented using the initial set of plugins, including P1v1.

At time t3 along timeline 603, application owner AO2 of App2 submits an App2 descriptor to the MCPS. At time t5, the initial set S2 of COR plugins to be used for App2, including P1v1, is identified by the MCPS. S2 may differ from S1, as App1 may have a different set of CORs than App1, or a different level of support may be needed for one or more CORs. At time t8, App1 is deployed/activated using resources selected at least in part by the MCPS. COR functionality for App2 is implemented using the initial set of plugins, including P1v1.

At time t6 along timeline 604, the plugin provider becomes aware of new requirements for the plugin P1, or a new and improved algorithm for satisfying P1's COR is found. Accordingly, the plugin provider develops a new and enhanced version of P1, version P1v2, and supplies this enhanced version (after performing its own testing of the new version) to MCPS at time t9. The MCPS performs its own testing of the new version, and approves P1v2 for deployment at time t10.

The new version of P1 may then be deployed by the MCPS for all the applications for which P1v1 was being used earlier, e.g., without requiring any code changes from the respective developers. For example, P1v2 may be deployed at time t11 for App1, and at time t12 for App2. From the perspective of application owners AO1 and AO2, no coding and no testing may be required to take advantage of the enhanced functionality provided by P1v2.

In various embodiments, in addition to simplifying the task of responding to changes in CORs, the MCPS may also simplify the task of updating application end user APIs and business logic. For example, at time t13 along timeline 602, AO1 may provide an updated version of the App1 descriptor, which may include changes to the signatures of one or more end user APIs of App1. The MCPS may compute the delta between the earlier version of App1's descriptor and the new version, and initiate any changes needed in the depicted embodiment. Such changes may include, for example, configuration changes for some of the COR plugins, changes to the resources used for the business logic, and so on. In some embodiments, if needed, the MCPS may send updated code templates to AO1, which may require business logic changes to be filled in. In at least some embodiments, the MCPS may send requests for plugin configuration parameter changes to AO1, if the MCPS detects that the changes to the App1 descriptor requires changes to any plugin parameters.

Example Plugin Related Interactions

In various embodiments, as mentioned earlier, application developers/owners may provide logical descriptors or specifications of their applications, including information about CORs and/or associated plugins, to an MCPS similar in features and functionality to MCPS 110 of FIG. 1 via programmatic interfaces. FIG. 7 illustrates aspects of an example graphical interface which may be used to specify properties of an application to be implemented with the help of a managed control plane service, according to at least some embodiments. Interface 700 may allow clients such as application owners to access a tutorial about the MCPS and how it is used in the depicted embodiment, e.g., using link 702. Via link 704, clients who are new to the MCPS may also example examples of application specifications expressed in the declarative language supported by the MCPS.

Interface element 710 may be used by the client to specify a name for a new application or service to be implemented with the help of the MCPS in the depicted embodiment. A user-friendly description of the application may be provided via interface element 712. The application specification may be provided in one of two ways using interface 700. Some clients may upload a pre-prepared application specification via interface element 714. Other clients may prefer to use interface 700 to launch an application specification builder tool (AppSpecBuilder) which provides step-by-guidance for generating the application specification. For example, such a tool may begin by asking the client to specify a set of data object types representing an application's data model, for each of which respective CRUD APIs may have to be supported. In some embodiments the tool may automatically generate code templates for the CRUD APIs, and request the application owner to populate the different API templates with application-specific business logic. The step-by-step tool may also ask the application owner/developer regarding specific CORs to be fulfilled for the application, and/or specific COR plugins to be used.

Region 716 of the interface 700 may be used for COR-related interactions in the depicted embodiment. A client may use link 717 to view or access definitions or explanations of a supported set of CORs. If the client wishes to utilize MCPS default plugins for all the supported CORs, interface element 718 may be used. Otherwise, the client may make their preferences known with regard to various CORs one by one. For example, for logging 720, the client may choose to use the MCPS default plugin using element 722, select a non-default or custom plugin 724, or opt-out of using plugins entirely by using element 726. The "no plugins needed" option may be used for a particular COR by a client if, for example, the client wants to incorporate a custom implementation of the COR functionality into their application (e.g., as part of the application-specific logic, or using a micro-service specified as part of the application), or if the client decides that the COR simply isn't needed for their application. Similarly, with respect to metrics collection 730, the client may choose to use the MCPS default plugin using element 732, select a non-default or custom plugin 734, or opt-out of using plugins entirely by using element 736. Similar options may be provided for various other CORs in the depicted embodiment via interface 700. The "Proceed to next step" interface element 755 may be used to access additional phases of the application configuration and deployment procedure, e.g., by filling in the details of application logic, providing plugin-specific configuration information, and so on.

Figure 8:
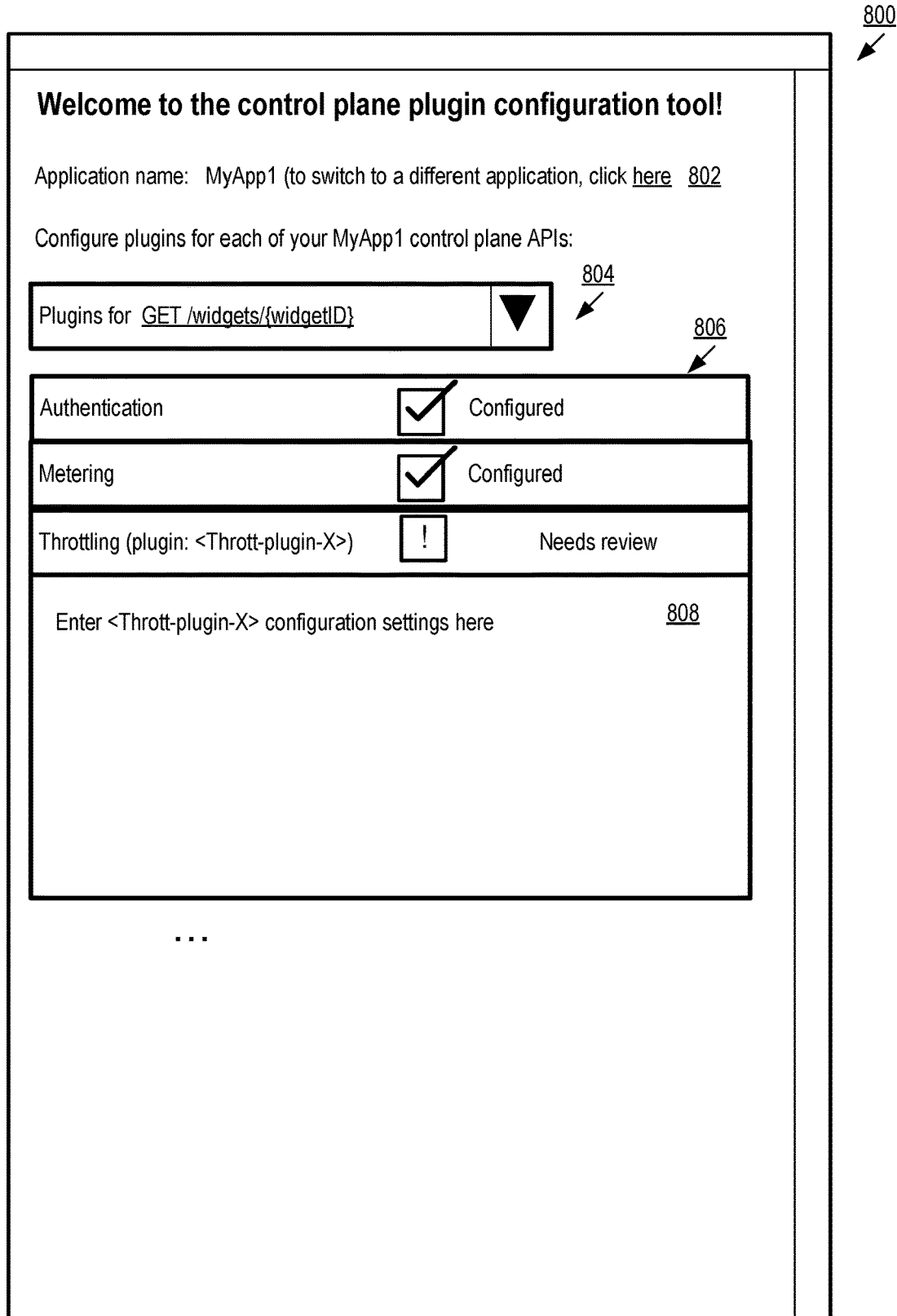
FIG. 8 illustrates aspects of an example graphical interface which may be used to specify configuration parameters of one or more plugins selected for an application, according to at least some embodiments.

For at least some COR plugins to be employed for an application, an application owner/developer/administrator may have to provide some amount of configuration information to the MCPS before the application can be deployed for end user access. For example, a unique customer-account-related token (available/assigned to the application owner by a provider network operator) which may have to be used during the process of generating digital signatures of the end user API requests may have to be provided to configure an authentication/authorization plugin. With respect to a logging plugin, identifiers or network addresses of one or more entities to which application log records generated with the help of the logging plugin should be provided or made accessible may have to provided, and so on. FIG. 8 illustrates aspects of an example graphical interface which may be used to specify configuration parameters of one or more plugins selected for an application, according to at least some embodiments.

Example interface 800 includes an element 802 which can be used by an MCPS client to select the particular application or service for which applicable COR plugins are to be configured in the depicted embodiment. A drop-down menu 804 may be used to select a control plane API (e.g., one of the CRUD APIs mentioned above) for which plugin configuration information is to be entered by the client. In the depicted example scenario, plugins applicable to a GET API which can be used to read or access information about a "widget" object with an identifier "widgetID" are being configured. As indicated by the check mark symbols in interface region 806, configuration parameters/details for an authentication plugin and a metering plugin have already been provided by the client using interface 800. However, as indicated by the exclamation mark, sufficient configuration information for a throttling plugin "Thrott-plugin-X" has not yet been obtained at the MCPS. The client may use region 808 to provide throttling-related plugin configuration parameters for the GET API (such as the maximum allowed rate of invocations of the GET API) in the depicted embodiment. It is noted that graphical interfaces with different combinations of elements than those shown in FIG. 7 and/or FIG. 8 may be employed in some embodiments for interactions between an MCPS and its clients regarding application specifications/descriptors and COR plugin configurations.

Methods for Simplifying Management of Control Planes

Figure 9:
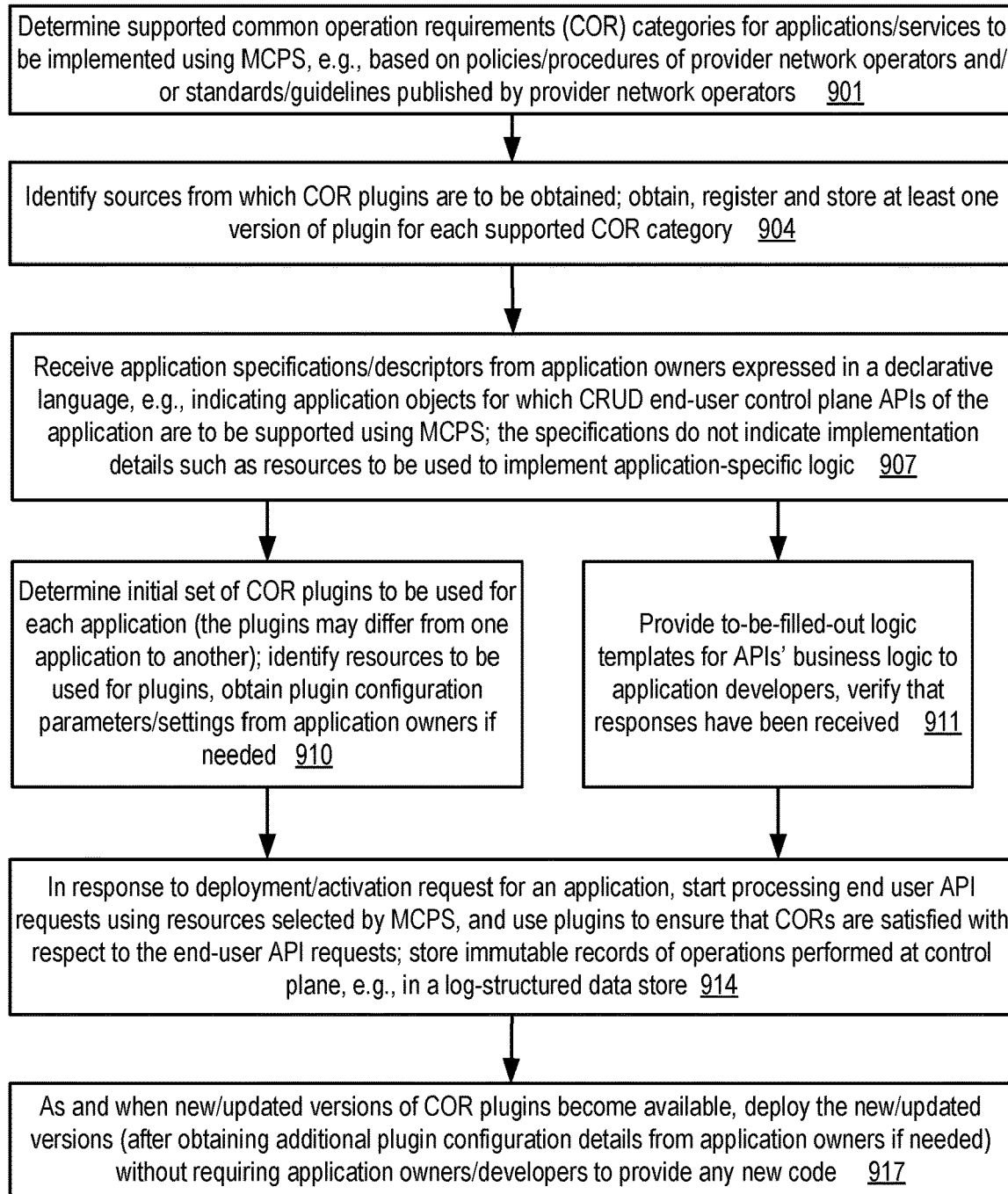
FIG. 9 is a flow diagram illustrating aspects of operations that may be performed at a managed control plane service, according to at least some embodiments.

FIG. 9 is a flow diagram illustrating aspects of operations that may be performed at a managed control plane service, according to at least some embodiments. As shown in element 901, a set of COR categories to be supported for applications/services implemented using an MCPS (similar in features and functionality to MCPS 110 of FIG. 1) may be determined in the depicted embodiment. The set of CORs may, for example, be chosen based on policies/procedures developed by the operators of one or more provider networks over the years, as control planes of external-facing and internal-use-only services have been designed and enhanced at the provider networks. In some embodiments, a provider network operator may publish (e.g., make available via web-based or other interfaces) standards or guidelines indicating the CORs which should be supported for applications implemented at the provider network.

The MCPS may store metadata pertaining to the CORs and plugins to be used to implement the CORs in various embodiments. For example, as shown in element 904, a set of sources of plugins for various CORs may be identified, and identification information may of the sources be stored as part of the plugin metadata. In at least some embodiments, providers of plugins for various CORs may submit registration requests for individual plugins to the MCPS, and the plugins which are approved may be added to a registry or library of CORs maintained by the MCPS. At least one version of a plugin for each COR category may be stored at the MCPS in the depicted embodiment.

Application specifications or descriptors expressed in a declarative language may be obtained at the MCPS in various embodiments via programmatic interfaces, e.g., from application developers or owners who wish to use the MCPS to simplify the management of control planes of the applications (element 907). A given application specification/descriptor may for example indicate the set of application objects for which CRUD (create, read, update, delete) APIs are to be supported as part of the application's control plane operations. Other (non-CRUD) APIs to be supported by the applications' control planes may also be indicated in some embodiments. The application specifications may not need to indicate any specific computing or storage resources to be used to implement the application-specific logic associated with the APIs of the application in at least some embodiments. In at least one embodiment, an application owner may specify particular resources to be used for one or more of the control plane operations if desired—e.g., if a special-purpose or high-performance hardware device is needed for an optimal implementation of a particular control plane operation, the application owner may specify the device instead of letting the MCPS choose a device.

An initial set of COR plugins to be used for a given application may be determined/selected at the MCPS in various embodiments (element 910). Plugins (and CORs to be satisfied) may differ from one application to another in different embodiments; in at least some embodiments, the application descriptors may indicate the CORs or plugins for each application. The MCPS may identify resources to be used for the different plugins (e.g., the service, external to the MCPS, whose APIs are to be invoked for each of the plugins and/or resources of the MCPS itself which may be used to execute programs/tasks indicated in the plugins) in various embodiments. If needed, configuration parameters/settings for one or more of the COR plugins to be used for an application may be obtained from the application developer/owner.

In at least some embodiments, the MCPS may provide to-be-filled out templates for the application-specific business logic associated with various APIs of an application to the application developer (element 911) as part of the procedure of setting up the application's control plane. Network endpoints and resources to be used to receive and parse the end user requests of the application may also be configured by the MCPS without requiring the application developer to configure the endpoints or the resources. The MCPS may also verify, before activating or deploying the application, that the templates have been populated by the application owner/developer.

A given application whose control plane is being implemented using the MCPS may be activated/deployed in response to a deployment request in the depicted embodiment (element 914). The resources selected by the MCPS may start processing end user API requests of the applications, and the APIs/programs/tasks indicated in the COR plugins may be executed to satisfy the CORs of the application. Some plugin operations may synchronous with respect to the end user requests, while others may be scheduled asynchronously with respect to the end user requests in at least some embodiments. In various embodiments, immutable records of operations performed at the control plane (e.g., at the end user API layer, and/or as part of application-specific business logic) may be stored in various embodiments. A log structured data store may be used in some implementations for such records. In at least one embodiment, listeners associated with asynchronous COR plugins may detect the insertion of entries into such data stores, and initiate actions to fulfil their respective CORs accordingly. In some embodiments, at least some of the immutable records may be accessed by application owners/developers/administrators, e.g., for debugging purposes.

As and when new/updated versions of the COR plugins become available, the versions may be deployed by the MCPS (e.g., after obtaining any configuration parameters/settings which may be needed for the new versions from the application developers) (element 917). Code changes and/or testing may not be needed from the application developers/owners in various embodiments.

Managed Control Planes for Applications with Multiple Constituent Services

Figure 10:
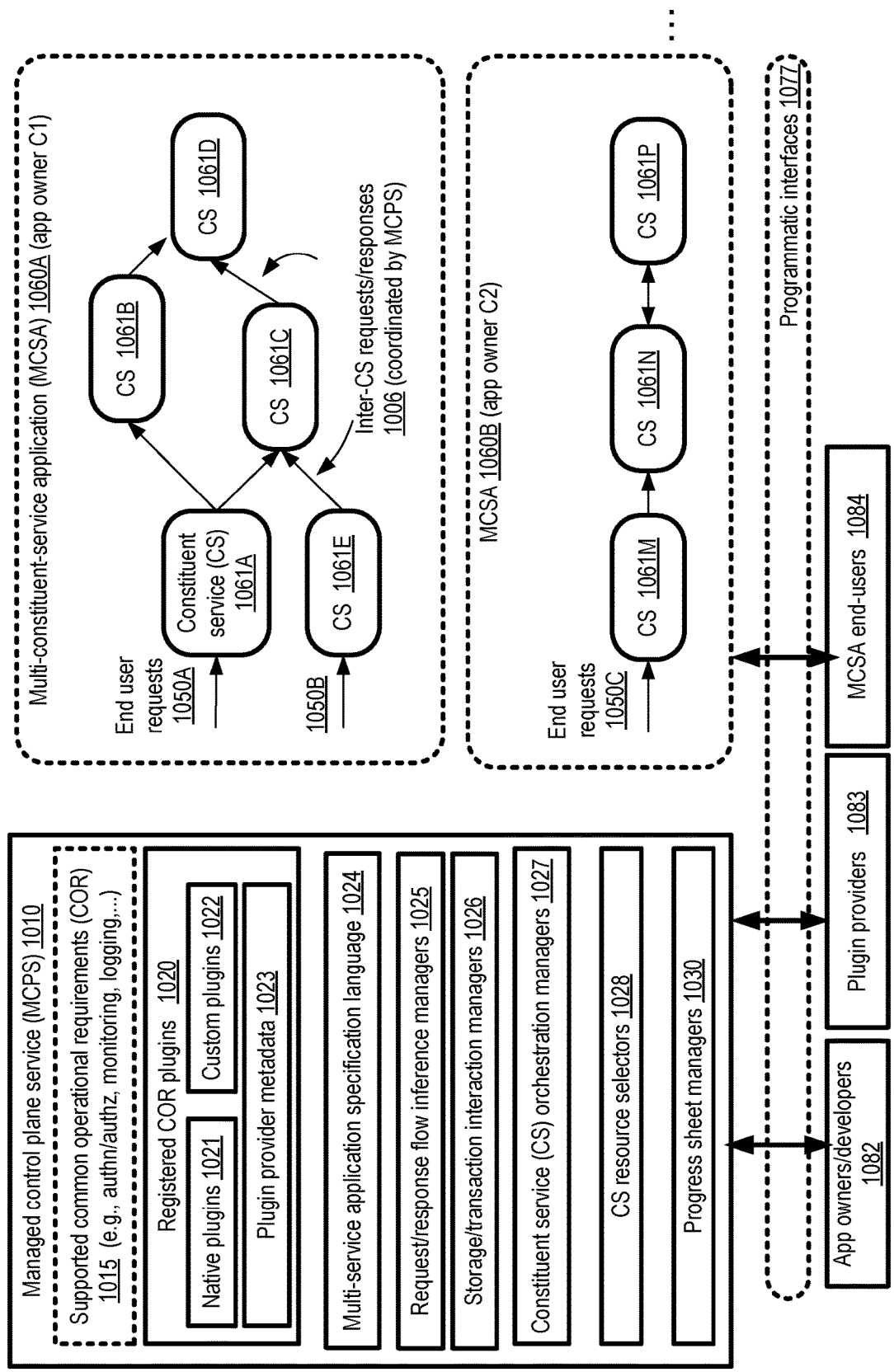
FIG. 10 illustrates an example system environment in which a managed control plane service may be used to simplify the integration of constituent services of an application, according to at least some embodiments.

In some cases, a complex application which is to be run using provider network resources and managed with the help of an MCPS may be designed as a collection of collaborating independently-developed smaller services, which may be referred to as micro-services or constituent services of the application herein. Such applications may be referred to as multi-constituent-service applications (MCSAs), multi-service applications, or service oriented architecture (SOA) applications. A given constituent service (CS) may represent a collection of business logic that exposes some set of APIs (which may in some cases be the end user APIs of the MCSA, and in some cases may be internal APIs used by other CSs), and is typically developed and updated independently (e.g., by a different engineering team) than other CSs of the same MCSA. FIG. 10 illustrates an example system environment in which a managed control plane service may be used to simplify the integration of constituent services of an application, according to at least some embodiments. As shown, system 1000 may comprise various resources and artifacts of an MCPS 1010 which adds support for MCSAs to the functionality discussed earlier for MCPS 110 of FIG. 1. For example, MCPS 1010 may utilize a variety of registered COR plugins 1020 to satisfy a set of supported common operational requirements (CORs) 1015 of MCSAs, including logging, authorization, authentication, monitoring etc. In the case of MCPS 1010, COR plugins may be used at the application level (e.g., for end user APIs of the MCSAs) and/or at the constituent service level (e.g., for APIs which may be used within individual constituent services or for communications among constituent services). In addition, MCPS 1010 may provide a number of inference capabilities—e.g., request/response flow inference managers 1025 may infer the sequence of requests/responses which have to flow among various constituent services of an application, storage/transaction interaction managers 1026 may infer at least some I/O operations required to satisfy persistence requirements for some data pertaining to the constituent services, and so on. The MCPS may identify or select the resources to be used to implement different constituent services and orchestrate interactions between them in the depicted embodiment. Note that MCPS 1010 may be implemented as one of a suite of network-accessible services of a provider network similar to provider network 102 of FIG. 1 in at least some embodiments.

The MCPS 1010 may implement one or more programmatic interfaces 1077, such as web-based consoles, APIs, command line tools, graphical user interfaces (e.g., including interfaces similar to those shown in FIG. 7 and FIG. 8 for specifying properties of applications, constituent services, and parameters for COR plugins) and the like in the depicted embodiment. A multi-service application specification language 1024 may be supported by the MCPS 1010, and used by MCPS clients such as application developers/ owners 1082 to provide logical descriptors of their applications via the programmatic interfaces from client devices (e.g., desktops, laptops, mobile devices and the like). The interfaces 1077 may also be used by plugin providers 1083 to submit representations of COR plugins (e.g., native plugins 1021 which may be implemented by engineering teams of a provider network at which the MCPS 1010 and other services are implemented, as well as custom plugins 1022 which may be implemented by customers or clients of a provider network). Metadata 1023 identifying the sources/providers of registered COR plugins 1020 may be stored at the MCPS 1010 in the depicted embodiment. MCSA end users 1084 may use programmatic interfaces 1077 to submit requests for the MCSAs and receive corresponding responses in various embodiments.

In at least some embodiments, the application descriptors provided to the MCPS 1010 may indicate the signatures (e.g., input/output data types) of a number of functions or APIs associated with a collection of constituent services, but may not specifically indicate the order in which such functions or APIs are to be executed, or the resources to be used for the functions/APIs. Request/response flow inference managers 1025 implemented at one or more computing devices of the MCPS 1010 may examine the application descriptors and generate directed acyclic graph (DAG) representations of the MCSAs, such as MCSA 1060A of application owner C1 and MCSA 1060B of application owner C2. Thus, for MCSA 1060A, the MCPS 1010 may use the application descriptor(s) provided by C1 infer that end user API requests 1050A of MCSA 1060A are to processed initially at CS 1061A, while end user API requests 1050B of MCSA 1060A are to processed initially at CS 1061E. The input/output data types indicated in the application descriptors may also be used to infer that in order to complete the processing of end user API requests 1050A, internal messages/requests may have to be sent from CS 1061A to CS 1061B and CS 1061C, from CS 1061B to CS 1061D and from CS 1061C to CS 1061D. Similarly, to complete the processing of end user API requests 1050B, internal messages/requests may have to be sent from CS 1061E to CS 1061C and from CS 1061C to CS 1061D. Similarly, for MCSA 1060B, the MCPS may infer that end user API requests 1050C are to processed initially at CS 1061M, and that in order to complete the processing of end user API requests 1050C, internal messages/requests may have to be sent from CS 1061M to CS 1061N and from CS 1061N to CS 1061P.

CS orchestration managers 1027 implemented at one or more computing devices may initiate various configuration operations to enable inter-CS request/response messages to flow (e.g., either synchronously or asynchronously) in the depicted embodiment. Such configuration operations may, for example, including setting up networking endpoints with respective IP addresses for the different CSs of each MCSA. CS resource selectors 1028 implemented at one or more computing devices may select specific resources (e.g., an event-driven dynamically-provisioned computing service (EDPCS) similar to EDPCS 134 of FIG. 1, compute instances of a virtualized computing service, software containers, etc.) for performing computations of the different micro-services in the depicted embodiment; the application owners/developers may not have to provide guidance on which specific resources/servers are to be used. The CS orchestration managers 1027 may coordinate inter-CS requests/responses 1006 in the depicted embodiment. The coordination operations may include, for example, causing an inter-service request to be (a) populated at a first resource selected by the MCPS to implement a given CS and (b) received at a second resource selected by the MCPS to implement another CS. In some embodiments, MCPS resources may be used as intermediaries between the CSs, e.g., in a hub-and-spoke configuration similar to that discussed below in the context of FIG. 11, so individual CS development teams do not have to provide code to integrate their CSs with other CSs. The CS orchestration managers 1027 may also cause responses to inter-CS communications/requests to be generated at the recipient CS of the inter-CS requests and sent to the request sources.

In at least some embodiments, storage/transaction interaction managers 1026 implemented at one or more computing devices may determine that persistent state information pertaining to the inter-CS interactions of an MCSA, or pertaining to other operations performed at one or more CSs is to be stored. In some cases, hints or annotations identifying some data objects as persistent may be included in the application descriptors; in other cases, the storage/transaction interaction managers may infer at least some I/O operations that have to be performed for persisting state information of the MCSA, without specific guidance or hints regarding the I/Os in the application descriptors. In at least one embodiment, schemas (e.g., columns of one or more tables, and data types of the columns) to be used to store persistent state information of an MCSA may be inferred from the contents of the application descriptors (which contain input and output data types/signatures of various APIs of the MCSA) by the storage/transaction interaction managers. In other embodiments, an application descriptor may specify the schema to be used. The storage/transaction interaction managers 1026 may select specific data stores to be used for the state information, and use the APIs supported by the data stores to store the state information as needed. The application owner may not have to specify the data store to be used; as with other resource selection tasks, the responsibility of identifying the data store to be used for the MCSA may be left to the MCPS 1010. Using one or more plugins of the registered COR plugins, respective tasks to be initiated to satisfy the one or more CORs of the MCSA may be implemented. For example, with respect to a logging COR, persistent log records representing the end user requests and/or the inter-CS requests may be stored with the help of a logging plugin. As discussed earlier, e.g., in the context of FIG. 5, appropriate combination of synchronous and asynchronous COR plugins may be used for any given MCSA in various embodiments. At least some plugins to be used for an MCSA may be indicated in the application descriptor of the MCSA in some embodiments. In other embodiments, one or more CORs and/or corresponding plugins may be selected for an MCSA or a given CS by the MCPS 1010.

In some embodiments the storage/transaction interaction managers 1026 may determine transaction boundaries for some set of operations of an MCSA. For example, the storage/transaction interaction managers 1026 may determine that a set of API invocations or inter-CS request/response interactions should be treated as an atomic operation, and rolled back if any one of the functions or interactions fails. The MCSA may send transaction requests to a transaction manager selected by storage/transaction interaction managers, indicating the read set and the write set of the transactions corresponding to the transaction boundaries in some embodiments, without requiring the application owner to specify the transaction manager. In some embodiments, I/O operations, associated schemas and/or transaction boundaries may be determined based at least in part on annotations included in the MCSA descriptors by the MCSA owners/developers—e.g., the annotation "persistent" may be added to one or more data object types indicated in the MCSA descriptors, or the annotations "transaction start" and "transaction end" may be placed around one or more CSs. If an application descriptor does not satisfy one or more criteria, e.g., if it is not possible to infer sequencing among CSs unambiguously, or if a partitioning/sharding key cannot be identified for a persistent data object to be created for MCSA, in some embodiments one or more messages requesting clarifications/corrections of the application descriptor may be sent back to the submitter, and the submitter may submit a modified version of the application descriptor. Remedial or compensation operations (e.g., deletions of records stored at data stores) associated with failed transactions or failed inter-CS requests may be initiated automatically by the MCPS 1010 in some embodiments. In some embodiments, an MCSA owner/developer may submit an updated version of an in-use MCSA descriptor to the MCPS 1010, which requires (or indicates) a change to a schema for persistent state information of the MCSA. In at least some embodiments, the change to the schema may be inferred by the storage/transaction interaction managers 1026, e.g., based on differences detected between the versions of the MCSA descriptors. The changes to the schema may be implemented transparently by the MCPS—e.g., subsequent to a determination that a schema to be used for the state information of an MCSA has changed, additional state information of the application may be stored (at a data store selected by the MCPS) without requiring code changes of the application to be provided by the application developer/owner.

In at least one embodiment, a data structure referred to as a progress sheet may be maintained for various end user requests of MCSAs, e.g., by progress sheet managers 1030 implemented at one or more computing devices. Interfaces 1077 may be used to view/examine the status of the processing of end user requests via such sheets. For example, an application owner may use a graphical or text representation of a progress sheet to determine when various inter-CS messages were sent in response to a particular end user request, how much time it took at each CS to process an inter-CS request, and so on. Such sheets may also be used to debug failures—e.g., to determine whether the reason that the processing of an end user request 1050 was not completed was that CS 1061B failed to complete its operations successfully, whether a problem at CS 1061C was the cause, and so on.

In some embodiments, a respective DAG may be generated at the MCPS 1010 not just at the MCSA level, indicating the interactions between constituent services of the MCSA, but also for one or more constituent services themselves, indicating the data flow between different internal functions/components/modules that make up the constituent services. In effect, a hierarchy of DAGs may be generated describing interactions between application components at different levels of granularity. The MCPS may identify and/or configure resources to be used at each level of the hierarchy in at least some embodiments—e.g., some resources may be selected at the function level, others at the CS level, and yet others at the MCSA level. Similarly, COR plugins may also be utilized at multiple levels of the hierarchy in some embodiments.

In various embodiments, the techniques described earlier regarding plugin management and configuration, e.g., in the context of FIG. 1-FIG. 9, may also be employed in the context of MCSAs by MCPS 1010. For example, any combination of the categories of CORs discussed in the context of FIG. 2 may be fulfilled for MCSAs, application owners may be requested to fill in templates specifying application-specific business logic and to provide configuration parameters for COR plugins, a log-structured data store may be used to store immutable records of control plane operations performed for various MCSAs, and so on. Updates to COR plugins may be rolled out transparently by the MCPS 1010, without requiring code changes from application developers, and so on.

Hub-and-Spoke Architecture for Inter-Constituent-Service Interactions

Figure 11:
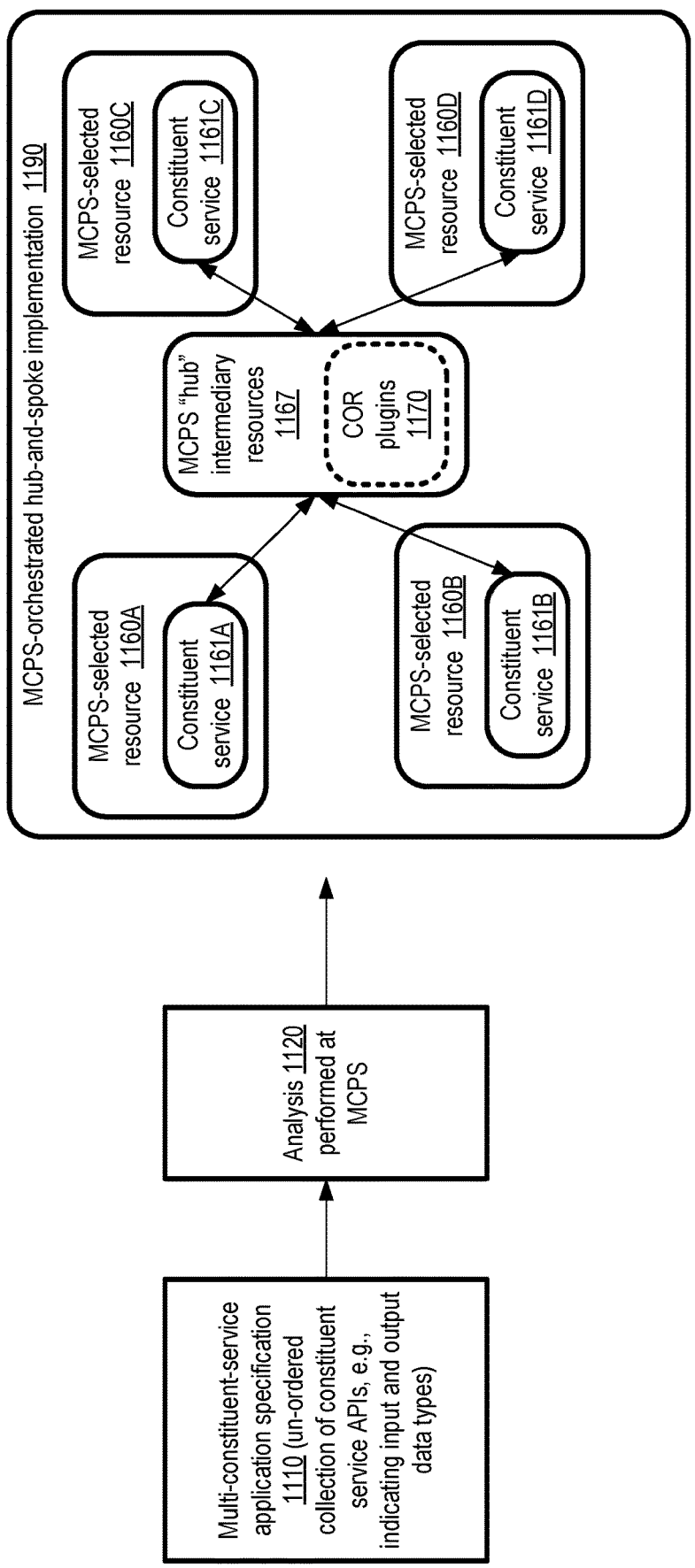
FIG. 11 illustrates an example hub-and-spoke architecture which may be used to implement a multi-service application, according to at least some embodiments.

FIG. 11 illustrates an example hub-and-spoke architecture which may be used to implement a multi-service application, according to at least some embodiments. In the depicted embodiment, an application owner may provide a specification 1110 of a multi-constituent-service application comprising a plurality of constituent services or microservices to an MCPS similar in features and functionality of MCPS 1010 of FIG. 1. The constituent services may be indicated by respective groups of one or more APIs, and the indications of the constituent services may be un-ordered in the application specification. Input and output data types of the CS APIs may be indicated in the application specification, and such data type information may be used at the MCPS to infer the sequences in which various CS APIs are to be invoked to accomplish the work required to fulfil a given end user request of the application. In addition to discovering the sequences in which the CS APIs are to be invoked, analysis 1120 performed at the MCPS may also include determining/inferring schemas of data objects to be stored to represent control plane state information of the MCSA in at least some embodiments.

In some embodiments, MCPS resources (e.g., one or more computing devices with associated network addresses) may be configured as intermediaries for interactions between constituent services, and the constituent services themselves may be implemented using resources selected/identified by the MCPS. This type of arrangement may be referred to as an MCPS-orchestrated hub-and-spoke implementation 1190. In the depicted scenario, MCPS-selected resources 1160A-1160D may be used to perform at least some of the operations of constituent services 1161A, 1161B, 1161C and 1161D respectively. If and when a request has to be sent from one CS 1161 to another, one or more MCPS resources (e.g., computing devices with respective network addresses set up by the MCPS) may act as intermediaries. Note that the sending CS may not necessarily even be aware that the request is going to be sent to any other CS; the MCPS resources may determine that a request is to be sent, and coordinate the sending of the request. Thus, for example, when a request has to be sent from CS 1161A to CS 1161D, the request parameters may be populated at MCPS-selected resource 1160A based on the business logic of CS 1161A, and a representation of the request may be obtained from resource 1160A at intermediary resource 1167. The intermediary resource 1167 may in turn cause the contents of the request to be obtained at MCPS-selected resource 1160D where the business logic of CS 1161D is executed. In various embodiments, the kind of hub-and-spoke architecture shown in FIG. 11 may have the following benefits (among others): (a) the development teams for each of the CSs involved may not have to spend time on integrating their code with the code used for any other CS; instead, they may only be required to provide data which the MCPS uses for inter-CS requests in a common format intelligible to the MCPS and (b) as and when configuration details such as network addresses etc. of the individual CSs change, such changes may be handled transparently by the MCPS hub intermediary resources 1167. COR plugins 1170 may be utilized by the hub intermediary resources to satisfy one or more CORs of the MCSA being implemented in the depicted embodiment. For example, in one implementation APIs indicated in one or more synchronous plugins may be invoked from the resources 1167, and immutable event records which can be accesses by listeners similar to log listeners 562 of FIG. 5 may be inserted into a data store by resources 1167. Note that not all the CORs of the MCSA may necessarily be satisfied using the MCPS hub intermediary resources 1167 in at least some embodiments; instead, one or more CORs may be satisfied using the resources 1160 at which the constituent services 1161 are run.

Managed I/O Operations, Transactions and Schemas

Figure 12:
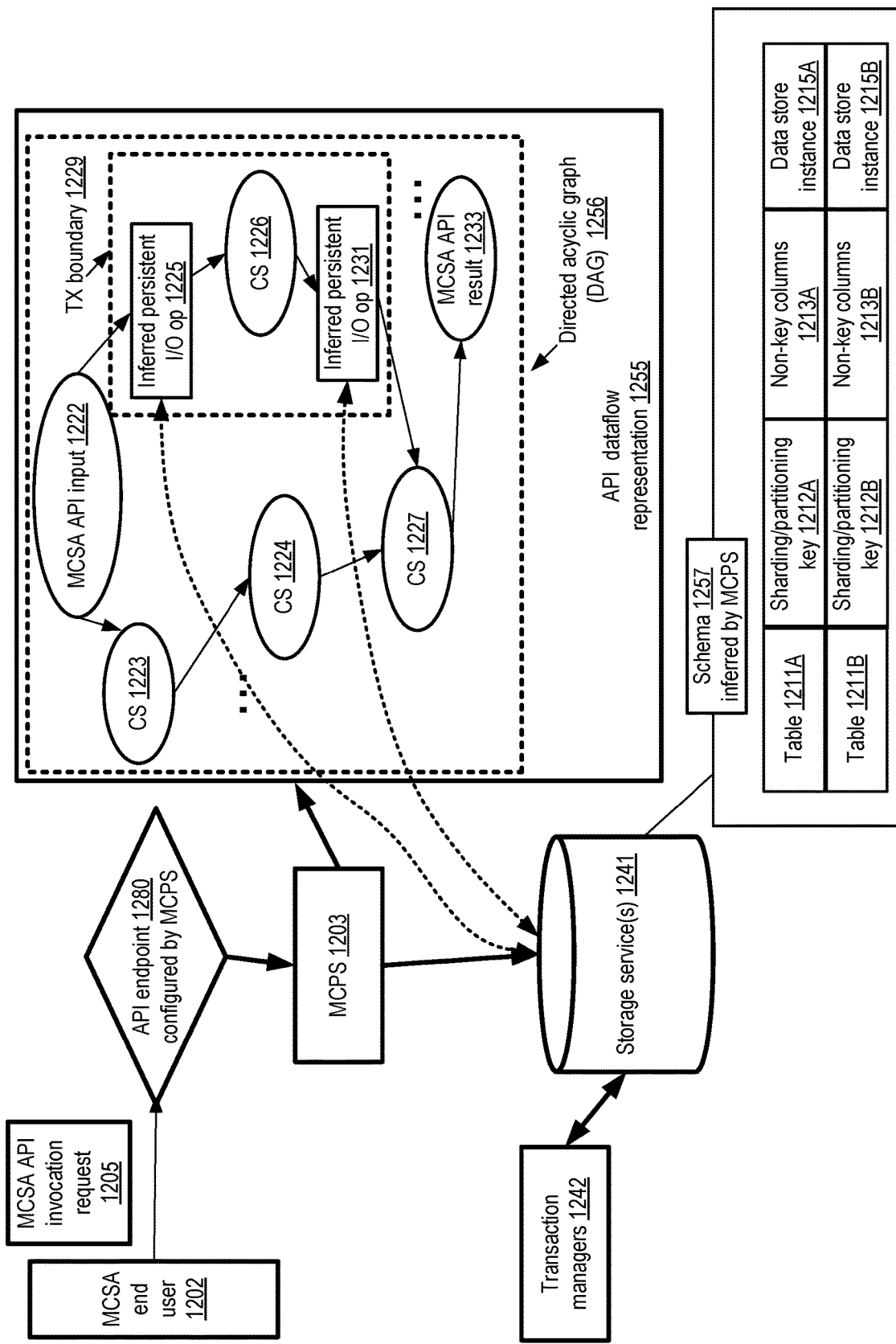
FIG. 12 illustrates an example of an inferred dataflow of an application which may be generated by a managed control plane service, according to at least some embodiments.

FIG. 12 illustrates an example of inferred schemas and I/O operations of a dataflow of a multi-constituent-service application (MCSA) implemented with the help of a managed control plane service, according to at least some embodiments. An MCSA end user 1202 may submit an MCSA API invocation request to an API endpoint 1280 that was established in response an MCSA deployment request directed to an MCPS 1203 earlier by the owner/developer of the MCSA. The request 1205 may comprise values of the input parameters of the API. Based at least in part on the analysis of an MCSA descriptor/specification submitted by the owner of the MCSA prior to the deployment request, the MCPS 1203 may have identified a number of constituent services (CSs) such as 1223, 1224, 1225, 1227 and 1231 which are to be used collectively to process the API indicated in request 1205, as well as the order in which the CSs are to be invoked. In a trivially simple scenario, if one API or function of CS 1224 has an output data type DT1, and among the other APIs indicated in the application specification, the only API with input data type DT1 is an API of CS 1227, the execution order "CS 1224 before CS 1227" may be inferred. I/O operations 1225 and 1231 to persistent storage, required for recording control plane state information pertaining to various end user requests, may also be inferred by the MCPS in at least some embodiments. Such I/O operations may, for example, store the values of various parameters of an internal inter-CS request, the times at which the requests and corresponding response are generated, and so on.

The MCPS 1203 may also determine or infer that persistent I/O operations 1225 and 1231 are to be performed, along with the computations associated with CS 1226, as an atomic transaction with transaction boundary 1229; that is, if any of the operations 1225, 1231 or computations of CS 1226 fail, then all the other operations of the transaction may have be rolled back and the entire transaction may have to be retried. Further, the MCPS 1203 may infer a schema 1257 to be used for state information of the MCSA, including the data generated in the persistent I/O operations. The schema 1257 may, for example, also indicate a respective sharding/partitioning key 1212 (e.g., 1212A or 1212B) for database tables 1211A and 1211B stored at data store instances 1215A and 1215B selected by the MCPS. Table 1211A may also include non-key columns/attributes 1213A, while table 1211B may include non-key columns 1213B. One or more storage services 1241 (e.g., similar to database/storage service 132 of FIG. 1) may be selected by the MCPS 1203 to store the MCSA state information in data store instances 1215 in the depicted embodiment. In some embodiments, a log structured data store similar to store 550 shown in FIG. 5 may be used for at least some persistent state information of an MCSA. In various embodiments, the MCPS may detect if/when the schema 1257 has to be changed (e.g., when a new version of an MCSA descriptor is received from an MCSA owner, with at least some differences in the input or output data types). The changes to the schema may be rolled out by the MCPS without requiring the application developers/owners to make any changes to their business logic code—e.g., the I/O operations needed to store persistent data according to the new schema (such as adding columns to a table, and populating the new columns in response to subsequent end user requests) may be performed by the MCSA.

In response to the API invocation request 1205, the execution of operations of a DAG 1256 of the API's dataflow representation 1255 may be initiated at resources selected by the MCPS 1203 in the depicted embodiment. The operations may collectively be referred to as an instance of the execution of the dataflow 1255. Starting with CS 1223 and I/O operation 1225, to which the input parameters 1222 of the API are provided, a sequence of operations may be performed with the results of each operation represented by a node of DAG being passed on to the next node in the DAG. Eventually, if all the operations succeed, an API result 1233 may be obtained and passed to the MCSA end user. Note that in a scenario in which outputs from several different DAG nodes are to be collectively used as input for another node, due to the asynchronous and distributed nature of the operations it may sometimes be the case that some of the outputs may become available earlier than others, so the MCPS may have to wait to accumulate all the needed input fields. A transaction request may be submitted by the MCPS in various embodiments, e.g., to transaction managers 1242 associated with one or more data stores at which persistent I/Os are performed as required based on the transaction boundaries 1229 shown in FIG. 12. Any combination of a variety of resource types may be used to execute the computations of the functions in different embodiments—e.g., depending on the types of operations to be performed, the MCPS may use its own execution resources, invoke other services such as a server-less dynamic provisioning computing service, a virtualized computing service or the like for one or more nodes. In at least some embodiments, decisions as to which service or resource is to be used for a given node of DAG 1256 may be made by the MCPS without guidance being provided by the end user 1202 or by the owner/developer of the MCSA. In various embodiments, decisions regarding data store choice, persistent object schemas, and/or transaction boundaries, which may have been made at the MCPS during the process of analyzing the MCSA specification, may govern details of the manner in which I/Os and other operations are performed at run-time as part of the response to the API invocation. One or more COR plugins, identified earlier by the MCPS for the MCSA, may be invoked at various steps of the dataflow shown in FIG. 12 in some embodiments.

In at least some embodiments, data structures representing the progress or status of respective dataflows initiated in response to end user API requests may be maintained at the MCPS, and at least a portion of the contents of such data structures may be exposed to MCPS clients as desired. Such data structures may be termed progress indicator sheets in some embodiments. In at least some embodiments, the results of various functions or I/O operations of a given dataflow instance, along with other metadata such as the times at which the functions/operations were initiated or completed, may be stored into a given sheet when available, e.g., by the services/resources at which the work is performed and/or by components of the MCPS that request the work from the services. After all the functions/operations of a given instance of a dataflow are completed, an indication of the completion of the instance may be provided to the execution requester (e.g., in the form of an output value or result 1233) and/or to one or more other destinations in at least some embodiments. Dynamically updated views of the progress indicator sheet (with new results or status information being added to the sheet as it becomes available) may be provided in at least some embodiments, e.g., via graphical user interfaces. In such embodiments, the sheet may represent an immutable ledger of status changes of the dataflow instance, which can be very helpful for debugging or other types of analysis.

Figure 13:
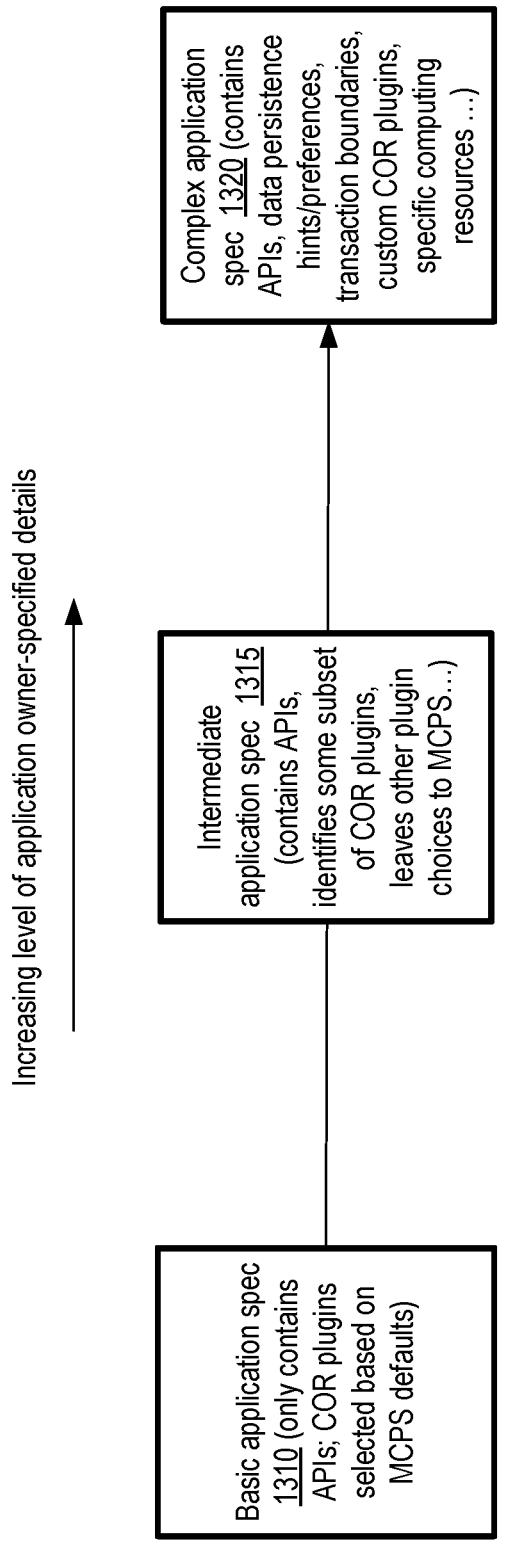
FIG. 13 illustrates variations in the extent to which application specifications submitted to a managed control plane service may be customized, according to at least some embodiments.

FIG. 13 illustrates variations in the extent to which application specifications submitted to a managed control plane service may be customized, according to at least some embodiments. Some clients of an MCPS similar in features and functionality to MCPS 1010 of FIG. 10 may provide simple or basic application specifications 1310, which only include an unordered collection of APIs of one or more constituent services of the application, along with their input and output data types. For such applications, the MCPS may determine the set of CORs to be satisfied, and choose corresponding default COR plugins.

Other application owners may include more details about the desired implementation of their applications. Some intermediate application specifications 1315 may, for example, include the APIs and identify some subset of the COR plugins to be used, while leaving choices regarding COR plugins to the MCPS. Yet other application owners may provide detailed or complex application specifications 1320. These types of application specifications may include the APIs, hints/preferences regarding state data persistence, transaction boundaries, one or more custom COR plugins, or even indicate specific computing resources (e.g., pre-configured compute instances of a virtualized computing service, or pre-configured software containers) to be used for one or more constituent services. In at least some embodiments, the application specification language supported by the MCPS may enable sophisticated application owners/developers to override at least some MCPS default behaviors (e.g., default COR plugin selections) if desired, while also allowing those application developers who are willing to rely largely on the MCPS designers' expertise to provide minimal or basic application specifications.

Methods for Implementing Multi-Constituent-Service Applications

FIG. 14 is a flow diagram illustrating aspects of operations that may be performed to orchestrate interactions between multiple constituent services of an application, according to at least some embodiments. As shown in element 1401, resources of an MCPS similar in features and functionality to MCPS 1010 of FIG. 10 may determine, e.g., based at least in part on an application descriptor received via programmatic interfaces of the MCPS, that a particular application App1 to be implemented at a provider network comprises a plurality of constituent services or micro-services. In some embodiments, a client of the MCPS (e.g., an owner, administrator, or developer of App1) may submit a single application descriptor which indicates all the constituent services, while in other embodiments separate descriptors may be submitted for respective constituent services. In various embodiments, the data type signatures (input data types and output data types) of APIs of the different constituent services may be indicated in the descriptors, including external (end-user-facing) APIs of App1 and internal APIs used for processing end-user requests, e.g., by interactions among the constituent services. The MCPS resources may determine the mappings between end-user requests of App1 and the constituent services, e.g., which specific constituent services are responsible for handling end-user or external requests.

In addition, a set of common operational requirements (CORs) which have to be fulfilled for App1 as a whole and/or its constituent services (without receiving code from the MCPS client who provided the App1 descriptor(s)) may be identified at the MCPS. Any combination of the COR categories discussed earlier, e.g., in the context of FIG. 2, may apply to the constituent services and/or App1 in different embodiments—e.g., log records indicating interactions among the constituent services may have to be generated, authorization/authentication tasks may have to be performed for individual constituent service requests, and so on. In at least some embodiments, some CORs may be specified in the application descriptors or constituent service descriptors provided by the MCPS client; in other embodiments, at least some CORs may be selected for App1 by the MCPS without receiving a specific indication of the CORs from the client, e.g., based on default COR requirements of applications managed by the MCPS.

In at least some embodiments, the MCPS may use the input and output data type information contained in the App1 descriptor(s) to infer the sequences in which request/response messages are to be sent among the constituent services in response to individual end-user requests of App1, and generate a respective directed acyclic graph (DAG) representing the request/response flows (element 1404). The nodes of the DAGs may represent resources at which micro-service processing operations are performed, while the edges may indicate requests/responses. In at least one embodiment, the MCPS may create templates for various CRUD APIs for data objects used in the constituent services based on analysis of the application descriptors, and request the application developers/owners to submit application-specific business logic for the CRUD APIs, which can then be run using resources selected by the MCPS. In some embodiments, the MCPS may determine persistent storage requirements and/or transaction boundaries associated with various operations performed in response to App1 end-user requests. In at least one embodiment, the application descriptors for App1 received at the MCPS may comprise schemas for data objects created and manipulated within App1, as well as hints (such as keywords indicating data objects are to be made persistent, or notations such as "start transaction" and "end transaction") which may be used to determine the persistent storage requirements and/or transaction boundaries. In one embodiment, the MCPS may infer at least some persistence requirements and/or transaction boundaries without receiving corresponding hints or indications, e.g., based on the flow of information in the DAGs. Note that in various embodiments, MCPS clients may not need to specify the kinds of data stores or storage services to be used for persistent data, or the transaction managers which are to be used to manage concurrency control and the like. Instead, in such embodiments, such decisions regarding the specific data stores and transaction managers to be used may be made at the MCPS resources. In some embodiments, after the application descriptors have been analyzed and the MCPS has determined the DAG(s) for App1 and identified associated persistence/transaction requirements, the client may be informed that App1 is ready for deployment.

A deployment request for App1 may be received at the MCPS in various embodiments (element 1407). In keeping with the overall approach that resource-related decisions are to be made by the MCPS, neither the application descriptors nor the deployment request may need to specify the resources at which the business logic of the constituent services is to be executed in some embodiments. In other embodiments, if an MCPS client wishes to override resource selection decisions of the MCPS, the client may indicate specific resources (e.g., special-purpose hardware devices, pre-configured compute instances set up by the client, and so on) to be used for one or more operations of one or more constituent services. Such override information may be provided in the application descriptors and/or in the deployment requests in different embodiments.

In response to the deployment request, the MCPS may configure one or more API endpoints (e.g., computing devices with IP addresses which can be accessed by App1 end users) to start receiving and processing App1 end-user API requests in the depicted embodiment. Other configuration operations to facilitate/enable communications between the constituent services may also be initiated in some embodiments, e.g., including the setting up of IP addresses for the different constituent services, setting up internal API endpoints (not necessarily accessible to end users) for some of the constituent services, and so on.

When a particular end-user API request is received, the MCPS may coordinate or orchestrate the request processing, including interactions between the constituent services which collaborate to fulfill the request (element 1413). For example, an inter-constituent-service request may be populated with parameter values and a data payload at a first resource selected by the MCPS for implementing a first constituent service, and the MCPS may cause the request to be received (either synchronously or asynchronously) at a second resource selected by the MCPS for implementing a second constituent service. In some cases, requests may be sent via the MCPS to other multiple constituent services. The second constituent service may in turn generate data which is used to respond to the request using the second resource, and cause the response to be sent back to the first resource via the MCPS. Depending on the transaction boundaries determined by the MCPS for various combinations of constituent service operations, transaction requests may be sent by the MCPS as needed, and compensation or cleanup operations (such as deletions of previously-stored persistent data objects of a partially-completed transaction) may be initiated by the MCPS if/when failures occur. Any of wide variety of resources may be selected by the MCPS for different micro-services in different embodiments, e.g., based on the details of the application-specific logic provided by the MCPS clients for the constituent services, including but not limited to an event-driven dynamically-provisioned computing service of a provider network, a compute instance of a virtualized computing service, or a software container. In some embodiments, resources of the MCPS may serve as hubs in a hub-and-spoke architecture (similar to that discussed in the context of FIG. 11 for messages exchanged between constituent services)—as such, the developers of the different constituent services may not have to write code to integrate their services with one another, and may simply use the MCPS as an intermediary for inter-service interactions. In at least one embodiment, the MCPS may capture one or more workload-related metrics regarding various constituent services, and cause additional resources (or fewer resources) to be employed for different constituent services as needed. For example, the MCPS may be able to detect, based on the responsiveness of a particular constituent service, that the overall performance of the application can be enhanced if additional resources were deployed for the particular constituent services (whereas applying additional resources for other constituent services may not have as much of a benefit). In such a scenario, the MCPS may automatically scale up the resources being used to implement the particular constituent service (e.g., without being requested to do so by the application owner), and/or notify the application owner. For example, if N compute instances were being used for the particular constituent service, an additional M compute instances may be launched for the particular constituent service.

As part of the processing of an end-user request, the MCPS may use one or more registered COR plugins of the kind discussed earlier to perform respective tasks (e.g., logging tasks, monitoring tasks, and so on) associated with the CORs which were identified for App1 in at least some embodiments. Synchronous and/or asynchronous plugins (of the kind discussed in the context of FIG. 5) may be used for the CORs in different embodiments. In at least one embodiment, an MCPS client may be requested to provide configuration details or settings for one or more plugins, e.g., as discussed earlier. In some cases, the COR tasks may be executed using one or more services of a provider network, such as a logging service, a monitoring service, an authorization service, and so on. In at least some embodiments, the MCPS may insert immutable log entries indicating various operations performed on behalf of App1 and its constituent services into a data store similar to data store 550 shown in FIG. 5. One or more asynchronous plugin tasks for App1 may be triggered as a result of the insertion of an entry into the data store in some embodiments. In one embodiment, a client of the MCPS may indicate one or more of the COR plugins to be used for App1 in the application descriptor(s) supplied for App1; in other embodiments, one or more of the COR plugins used for App1 may be selected by the MCPS.

Updates of several kinds may be handled transparently by the MCPS in the depicted embodiment (element 1417). For example, if and when a COR plugin is updated by its provider, the new version of the plugin may be rolled out for subsequent App1 end-user requests without requiring any changes to App. In at least some embodiments, an MCPS client may submit updated versions of application descriptors. If/when such an update is received, the MCPS may modify its DAGs accordingly if needed, and detect whether any changes to persistent data schemas of the applications have to be made. If such schema changes have to be implemented, they may be rolled out by the MCPS without requiring the application owners to make any code changes—e.g., any needed changes to database schemas may be initiated by the MCPS at the database services selected for the applications' persistent data by the MCPS.

It is noted that in various embodiments, some of the operations shown in the flow diagrams of FIG. 9 and/or FIG. 14 may be implemented in a different order than that shown in the figure, or may be performed in parallel rather than sequentially. Additionally, some of the operations shown in FIG. 9 and/or FIG. 14 may not be required in one or more implementations.

Illustrative Computer System

Figure 15:
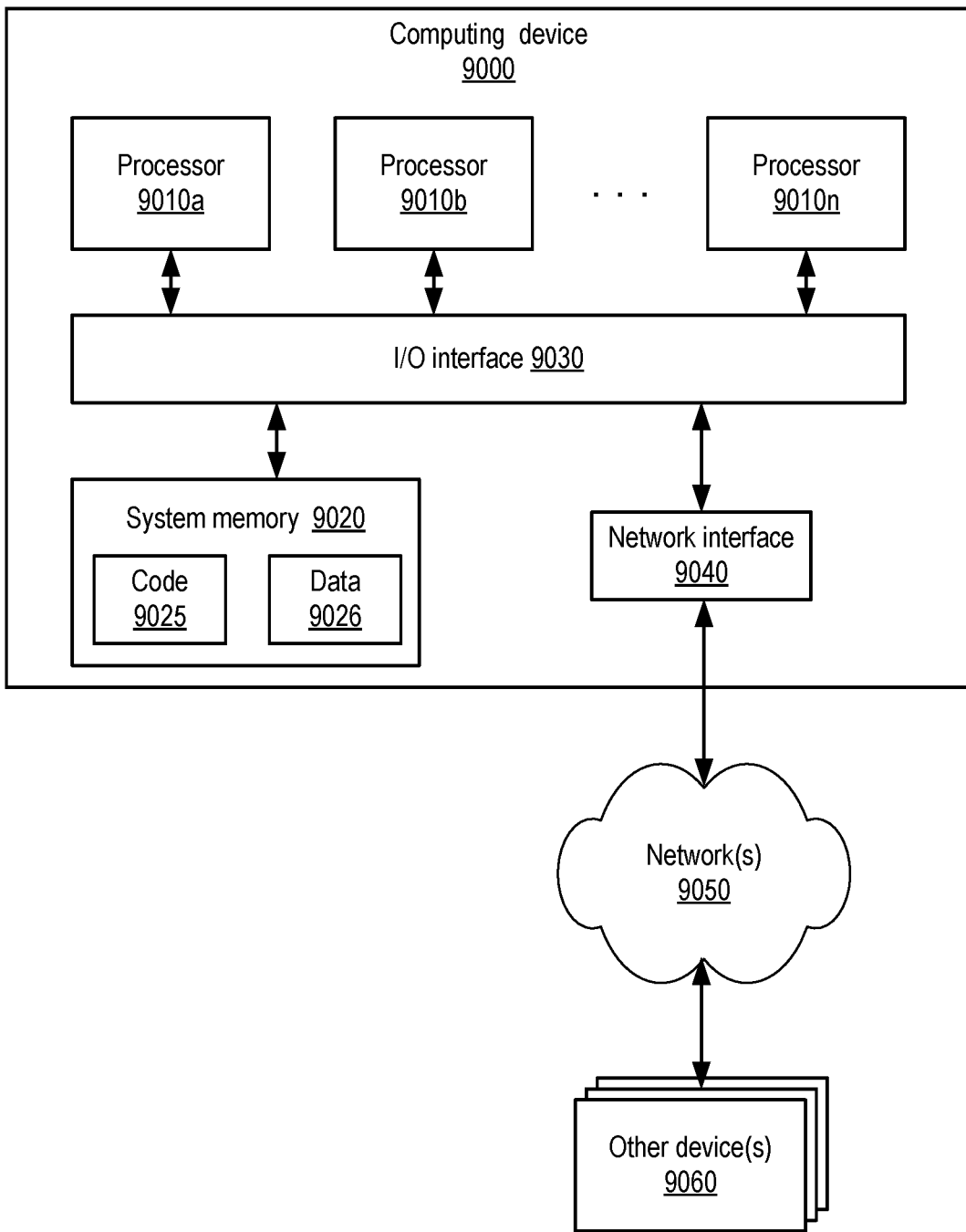
FIG. 15 is a block diagram illustrating an example computing device that may be used in at least some embodiments.

In at least some embodiments, a server that implements the types of techniques described herein (e.g., various functions of a managed control plane service and other services of a provider network), may include a general-purpose computer system that includes or is configured to access one or more computer-accessible media. FIG. 15 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 14, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 14. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices comprising one or more processors and associated memory, configured to:
obtain, at a managed control plane service of a provider network, a specification of an application, wherein the specification (a) indicates one or more end-user application programming interfaces (APIs) of the application and (b) does not identify a resource to be used for performing a computation in response to an invocation of the one or more end-user APIs of the application;
determine, at the managed control plane service, a set of common operational requirement plugins to be used for the application, wherein a common operational requirement plugin of the set of common operational requirement plugins indicates (a) at least one API of a service, other than the managed control plane service, to be implemented to satisfy an operational requirement of the application, without requiring a developer of the application to provide code to satisfy the operational requirement and (b) one or more programs to be executed at the managed control plane service to satisfy the operational requirement of the application; and
cause, by the managed control plane service, in response to an invocation of an end-user API of the application, (a) one or more computations of the application-specific logic associated with the end-user API to be performed at a resource selected by the managed control plane service, (b) an API indicated in a particular common operational requirements plugin of the set of common operational requirement plugins to be implemented and (c) a program indicated in the particular common operational requirements plugin to be executed at a resource selected by the managed control plane service; and
store, in a log-structured data store, respective immutable records of a plurality of operations performed at the managed control plane service, wherein at least one task of a second common operational requirements plugin of the set of common operational requirement plugins is initiated based on a particular immutable record of the respective immutable records.

2. The system as recited in claim 1, wherein the one or more computing devices include further instructions that upon execution on or across the one or more computing devices further cause the one or more computing devices to:
provide an indication of a plurality of common operational requirement plugins via one or more programmatic interfaces; and
include at least one common operational requirement plugin in the set of common operational requirement plugins based at least in part on input received via the one or more programmatic interfaces.

3. The system as recited in claim 1, wherein the one or more computing devices include further instructions that upon execution on or across the one or more computing devices further cause the one or more computing devices to:
obtain, before a response to the end-user API is provided to an invoker of the end-user API, a result of the API indicated in the particular common operational requirements plugin.

4. The system as recited in claim 1, wherein at least one operation triggered by invocation of the API indicated in the particular common operational requirements plugin is performed asynchronously with respect to a provision of a response to an invoker of the end-user API.

5. The system as recited in claim 1, wherein the one or more computing devices include further instructions that upon execution on or across the one or more computing devices further cause the one or more computing devices to:
utilize, by the managed control plane service, a different set of common operational requirement plugins for another application, wherein the different set does not include the particular common operational requirement plugin.

6. A computer-implemented method, comprising:
obtaining, at a managed control plane service, a descriptor of a first application, wherein the descriptor does not identify a resource to be used for performing a computation in response to an invocation of one or more end-user application programming interfaces (APIs) of the first application;
identifying, by the managed control plane service, a first set of common operational requirement plugins to be used for the first application, wherein a first common operational requirement plugin of the first set of common operational requirement plugins indicates at least one task to be performed at a computing device external to the managed control plane service to satisfy an operational requirement of one or more applications including the first application;
causing, by the managed control plane service, in response to the invocation of an end-user API of the first application, (a) one or more computations of application-specific logic to be performed at a resource selected by the managed control plane service and (b) a task indicated in the first common operational requirement plugin of the first set of common operational requirement plugins to be initiated;
causing to be presented, via a programmatic interface, a request for one or more configuration parameters of the first common operational requirements plugin; and
verifying, prior to causing the task indicated in the first common operational requirement plugin to be performed, that the one or more configuration parameters have been obtained.

7. The computer-implemented method as recited in claim 6, wherein the first set of common operational requirement plugins comprises one or more of: an authorization plugin, a metering plugin, a metrics collection plugin, a dashboard plugin, an automated tagging plugin, a logging plugin, a plugin for integration with an isolated virtual network, a data partitioning plugin, a caching plugin, a security plugin, an encryption plugin, a configuration constraints compliance plugin, a throttling plugin, or an application cloning plugin.

8. The computer-implemented method as recited in claim 6, wherein the first common application requirement plugin is a synchronous plugin, the computer-implemented method further comprising:

obtaining a result of the task indicated in the first common operational requirements plugin before a response to the end-user API is provided to an invoker of the end-user API.

9. The computer-implemented method as recited in claim 6, wherein the first common application requirement plugin is an asynchronous plugin, wherein at least a portion of the task is performed asynchronously with respect to a provision of a response to an invoker of the end-user API.

10. The computer-implemented method as recited in claim 6, wherein the resource selected by the managed control plane service comprises one or more of: (a) an event-driven dynamically-provisioned computing service, (b) a compute instance of a virtualized computing service, or (c) a software container.

11. The computer-implemented method as recited in claim 6, further comprising:
storing, in a log-structured data store, respective immutable records of a plurality of operations performed at the managed control plane service, wherein at least one task of a second common operational requirements plugin of the first set of common operational requirement plugins is initiated based on a particular immutable record of the respective immutable records.

12. The computer-implemented method as recited in claim 6, further comprising:
identifying, by the managed control plane service, a second set of common operational requirement plugins to be used for a second application,
wherein the second set comprises a second common operational requirement plugin which is not in the first set of common operational requirement plugins.

13. The computer-implemented method as recited in claim 6, further comprising:
obtaining, via a programmatic interface, an indication that the first common operational requirement plugin is to be used for the first application.

14. The computer-implemented method as recited in claim 6, further comprising:
including, by the managed control plane service, a second common operational requirement plugin in the first set of common operational requirement plugins without receiving an indication of the second common operational requirement plugin from an application developer.

15. One or more non-transitory computer-accessible storage media storing program instructions that when executed on or across one or more processors cause the one or more processors to:
determine, at a managed control plane service, one or more end-user application programming interfaces (APIs) of an application to be implemented at a provider network;
identify, by the managed control plane service, a set of common operational requirements to be fulfilled for the application without obtaining program code for fulfilling the set of common operational requirements;
cause, by the managed control plane service, in response to an invocation of an end-user API of the one or more end-user APIs, (a) one or more computations to be performed at a resource selected by the managed control plane service, and (b) a task to be initiated to satisfy a common operational requirement of the set of common operational requirements; and
store, in response to a plugin registration request, metadata identifying a source of a plugin to be used for fulfilling another common operational requirement which is not in the set of common operational requirements.

16. The one or more non-transitory computer-accessible storage media as recited in claim 15, storing further program instructions that when executed on or across the one or more processors further cause the one or more processors to:
cause to be presented, via a programmatic interface, a request to populate an application-specific code template generated at the managed control plane service for the end-user API; and
verify, prior to the invocation of the end-user API, that the application-specific code template has been populated.

17. The one or more non-transitory computer-accessible storage media as recited in claim 15, storing further program instructions that when executed on or across the one or more processors further cause the one or more processors to:
store metadata identifying respective sources of a plurality of common operational requirement plugins, including a source of a particular common operational requirement plugin which indicates the task; and
verify, in response to receiving a new version of the common operational requirement plugin, that the new version was sent from the source identified in the metadata.

18. The one or more non-transitory computer-accessible storage media as recited in claim 15, wherein the set of common operational requirements comprises one or more of: an authorization requirement, a metering requirement, a metrics collection requirement, a dashboard requirement, an automated tagging requirement, a logging requirement, a requirement for integration with an isolated virtual network, a data partitioning requirement, a caching requirement, a security requirement, an encryption requirement, a configuration constraints compliance requirement, a throttling requirement, or an application cloning requirement.

* * * * *